US012576519B2

(12) United States Patent (10) Patent No.: US 12,576,519 B2
Tanneberg et al. (45) Date of Patent: Mar. 17, 2026

(54) LEARNING TYPE-GENERALIZED SKILLS FOR SYMBOLIC PLANNING FOR AUTONOMOUS DEVICES

(71) Applicant: Honda Motor Co., Ltd., Tokyo (JP)

(72) Inventors: Daniel Tanneberg, Offenbach (DE); Michael Gienger, Offenbach (DE)

(73) Assignee: Honda Motor Co., Ltd., Tokyo (JP)

( * ) Notice: Subject to any disclaimer, the term of this patent is extended or adjusted under 35 U.S.C. 154(b) by 327 days.

(21) Appl. No.: 18/365,228

(22) Filed: Aug. 4, 2023

(65) Prior Publication Data

US 2024/0091932 A1 Mar. 21, 2024

(30) Foreign Application Priority Data

Aug. 5, 2022 (EP) .................................... 22189050
Feb. 9, 2023 (EP) .................................... 23155823

(51) Int. Cl.
B25J 9/16 (2006.01)
B25J 11/00 (2006.01)
G06F 18/23 (2023.01)
(52) U.S. Cl.
CPC ............. B25J 9/163 (2013.01); B25J 9/1661 (2013.01); B25J 11/008 (2013.01); G06F 18/23 (2023.01)
(58) Field of Classification Search
CPC ........ B25J 9/163; B25J 9/1661; B25J 11/008; G06F 18/23; G06N 5/022; G06N 20/00
See application file for complete search history.

(56) References Cited

U.S. PATENT DOCUMENTS

| | | | |
|---|---|---|---|
| 9,070,083 B2 | 6/2015 | Suh et al. | |
| 10,926,408 B1 * | 2/2021 | Vogelsong | .............. B25J 9/163 |
| 11,086,938 B2 | 8/2021 | Tellex et al. | |
| 2021/0122036 A1 * | 4/2021 | Buerger | ................ B25J 9/1664 |

(Continued)

FOREIGN PATENT DOCUMENTS

WO 2022012265 1/2022

OTHER PUBLICATIONS

Förster, J., Ott, L., Nieto, J., Siegwart, R., and Chung, J. J., "Automatic Extension of a Symbolic Mobile Manipulation Skill Set", <i> arXiv e-prints</i>, Art. No. arXiv:2010.10651, 2020. doi:10.48550/arXiv.2010.10651. (Year: 2021).*

(Continued)

*Primary Examiner* — Abby Lin
*Assistant Examiner* — Danielle M Jackson
(74) *Attorney, Agent, or Firm* — JCIPRNET

(57) ABSTRACT

The present disclosure relates to a computer-implemented method for learning operators for planning a behavior of an autonomous device. The method includes obtaining a set of training data including observations of a plurality of skills executable by the autonomous device in an interaction with at least one entity for addressing a first task, obtaining a predetermined set of data defining a hierarchy of entities including the at least one entity, learning a set of individual skills based on the obtained set of training data, generating a set of generalized skills by generalizing the learned set of individual skills based on the predetermined set of data that defining a hierarchy of entities, performing behavior planning of the autonomous device for addressing a second task different from the first task based on the generalized set of skills.

13 Claims, 14 Drawing Sheets

(S1: LEARNING GENERALIZED SKILLS)

(56)                    References Cited

U.S. PATENT DOCUMENTS

| | | | |
|---|---|---|---|
| 2021/0229281 A1* | 7/2021 | Natarajan | B25J 9/163 |
| 2021/0299860 A1* | 9/2021 | Ren | B25J 13/088 |
| 2022/0288777 A1* | 9/2022 | Harms | B25J 9/1661 |
| 2023/0080342 A1* | 3/2023 | Roychoudhury | G05D 1/0246 |
| | | | 701/25 |
| 2023/0241773 A1* | 8/2023 | Lian | G06N 3/08 |
| | | | 700/246 |
| 2024/0086776 A1* | 3/2024 | Huang | G06N 3/0985 |

OTHER PUBLICATIONS

"Search Report of Europe Counterpart Application", issued on Jul. 24, 2023, p. 1-p. 13.

Julian Förster et al., "Automatic extension of a symbolic mobile manipulation skill set," arXiv. org, Cornell University Library, arXiv:2010.10651v2 [cs.RO], Sep. 2021, pp. 1-8.

Chen Wang, et al., "Generalizable Task Planning Through Representation Pretraining," in IEEE Robotics and Automation Letters, vol. 7, No. 3, Jul. 2022, pp. 8299-8306.

Oliver Kroemer, et al., "A Review of Robot Learning for Manipulation: Challenges, Representations, and Algorithms," arXiv. org, Cornell University Library, arXiv:1907.03146v2 [cs.RO], Jul. 2019, pp. 1-43.

Tom Silver, et al., "Learning Neuro-Symbolic Skills for Bilevel Planning," arXiv. org, Cornell University Library, arXiv:2206. 10680v1 [cs.RO], Jun. 2022, pp. 1-20.

Julian Eggert et al., "Action Representation for Intelligent Agents using Memory Nets", Conference Paper of International Joint Conference on Knowledge Discovery, Knowledge Engineering, and Knowledge Management, Jan. 2021, pp. 1-25.

Yifeng Zhu et al., "Hierarchical Planning for Long-Horizon Manipulation with Geometric and Symbolic Scene Graphs", 2021 IEEE International Conference on Robotics and Automation (ICRA), Mar. 30, 2021, pp. 1-8.

Tadahiro Taniguchi et al., "Symbol Emergence in Cognitive Developmental Systems: a Survey", IEEE Transactions on Cognitive and Developmental Systems, Dec. 2019, pp. 1-23.

Nicholas Roy et al., "From Machine Learning to Robotics: Challenges and Opportunities for Embodied Intelligence", arXiv:2110. 15245v1 [cs.RO], Oct. 28, 2021, pp. 1-39.

Oliver Kroemer et al., "A Review of Robot Learning for Manipulation: Challenges, Representations, and Algorithms", arXiv:1907. 03146v3 [cs.RO], Nov. 6, 2020, pp. 1-80.

Caelan Reed Garrett et al., "Integrated Task and Motion Planning", arXiv:2010.01083v1 [cs.RO], Oct. 2, 2020, pp. 1-30.

Maximilian Diehl et al., "Automated Generation of Robotic Planning Domains from Observations", obarXiv: 2105.13604v2 [cs. RO], Sep. 19, 2021, pp. 1-8.

Michael Beetz et al., "KnowRob 2.0—A 2nd Generation Knowledge Processing Framework for Cognition-enabled Robotic Agents", 2018 IEEE International Conference on Robotics and Automation (ICRA), May 21-25, 2018, pp. 1-8.

Nichola Abdo et al., "Learning Manipulation Actions from a Few Demonstrations", 2013 IEEE International Conference on Robotics and Automation, May 6-10, 2013, pp. 1-8.

Wentao Yuan et al., "SORNet: Spatial Object-Centric Representations for Sequential Manipulation", arXiv:2109.03891v3 [cs.RO], Sep. 14, 2022, pp. 1-21.

Joshua B. Tenenbaum et al., "How to Grow a Mind: Statistics, Structure, and Abstraction", Science, Mar. 11, 2011, pp. 1279-1285.

Tom Silver et al., "Learning Symbolic Operators for Task and Motion Planning", arXiv:2103.00589v2 [cs.RO], Jul. 15, 2021, pp. 1-9.

Silvia Richter, "Landmark-Based Heuristics and Search Control for Automated Planning (Extended Abstract)", Proceedings of the Twenty-Third International Joint Conference on Artificial Intelligence, Aug. 2013, pp. 3126-3130.

Hanna M. Pasula et al., "Learning Symbolic Models of Stochastic Domains", Journal of Artificial Intelligence Research, Jul. 2007, pp. 309-352.

Alex Mitrevski et al., "Representation and Experience-Based Learning of Explainable Models for Robot Action Execution", 2020 IEEE/RSJ International Conference on Intelligent Robots and Systems (IROS), Oct. 25-29, 2020, pp. 919-925.

Leonardo Lamanna et al., "Online Learning of Action Models for PDDL Planning", Proceedings of the Thirtieth International Joint Conference on Artificial Intelligence (IJCAI-21), Aug. 19-26, 2021, pp. 4112-4118.

Brenden M. Lake et al., "Building Machines That Learn and Think Like People", arXiv:1604.00289v3 [cs.AI], Nov. 2, 2016, pp. 1-58.

Johannes Kulick et al., "Active Learning for Teaching a Robot Grounded Relational Symbols", International Joint Conference of Artificial Intelligence, Jan. 2013, pp. 1-7.

George Konidaris et al., "From Skills to Symbols: Learning Symbolic Representations for Abstract High-Level Planning", Journal of Articial Intelligence Research, Jan. 2018, pp. 215-289.

George Konidaris, "On the necessity of abstraction", Current Opinion in Behavioral Sciences, Oct. 2019, pp. 1-8.

Beomjoon Kim et al., "Learning value functions with relational state representations for guiding task-and-motion planning", Proceedings of the Conference on Robot Learning, Nov. 30-Dec. 1, 2019, pp. 1-10.

Jörg Hoffmann et al., "Ordered Landmarks in Planning", Journal of Artificial Intelligence Research, Nov. 2004, pp. 215-278.

Peter E. Hart et al., "A Formal Basis for the Heuristic Determination of Minimum Cost Paths", IEEE Transactions on Systems Science and Cybernetics, Jul. 1968, pp. 100-107.

Maria Fox et al., "PDDL2.1 : An Extension to PDDL for Expressing Temporal Planning Domains", Journal of Artificial Intelligence Research, Dec. 2003, pp. 61-124.

Nuri Cingillioglu et al., "pix2rule: End-to-end Neuro-symbolic Rule Learning", arXiv:2106.07487v3 [cs.LG], Feb. 28, 2022, pp. 1-41.

Rohan Chitnis et al., "Learning Neuro-Symbolic Relational Transition Models for Bilevel Planning", arXiv:2105.14074v3 [cs.AI], Jun. 30, 2022, pp. 1-8.

Blai Bonet et al., "Planning as heuristic search", Artificial Intelligence, Jun. 2001, pp. 5-33.

Masataro Asai et al., "Classical Planning in Deep Latent Space: Bridging the Subsymbolic-Symbolic Boundary", arXiv:1705. 00154v3 [cs.AI], Dec. 3, 2017, pp. 1-26.

Ankuj Arora et al., "A Review of Learning Planning Action Models", The Knowledge Engineering Review, Nov. 21, 2018, pp. 1-31.

Eren Erdal Aksoy et al., "Enriched Manipulation Action Semantics for Robot Execution of Time Constrained Tasks", 2016 IEEE-RAS 16th International Conference on Humanoid Robots (Humanoids), Nov. 15-17, 2016, pp. 1-8.

Seyed Reza Ahmadzadeh et al., "Learning Symbolic Representations of Actions from Human Demonstrations", 2015 IEEE International Conference on Robotics and Automation (ICRA), May 26-30, 2015, pp. 1-8.

* cited by examiner

LEARNING GENERALIZED SKILLS

S1

PLANNING WITH GENERALIZED
SKILLS

IMAGINING GENERALIZED SKILLS

S2

(S1: LEARNING GENERALIZED SKILLS)

OBTAINING TRAINING DATA   S11

LEARNING INDIVIDUAL SKILLS
FROM TRAINING DATA $D$   S12

ITERATIVELY GENERALIZING LEARNED
INDIVIDUAL SKILLS UNTIL
CONVERGENCE CRITERION IS MET   S13

(S12: LEARNING INDIVIDUAL SKILLS FROM TRAINING DATA)

(CLUSTERING LIFTED EFFECTS)

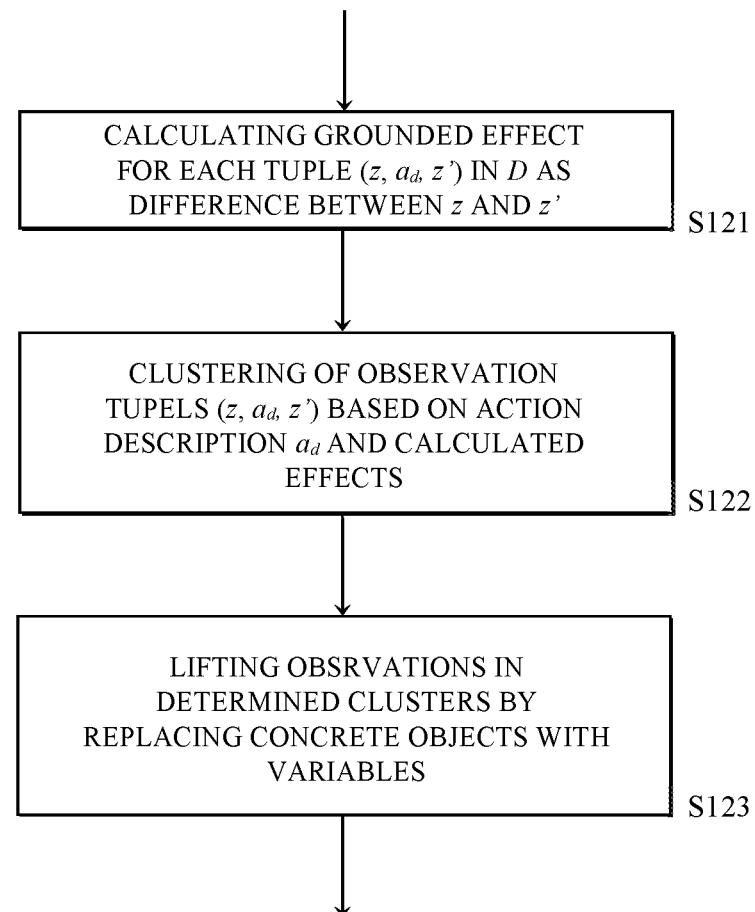

CALCULATING GROUNDED EFFECT
FOR EACH TUPLE ($z$, $a_d$, $z'$) IN $D$ AS
DIFFERENCE BETWEEN $z$ AND $z'$    S121

CLUSTERING OF OBSERVATION
TUPELS ($z$, $a_d$, $z'$) BASED ON ACTION
DESCRIPTION $a_d$ AND CALCULATED
EFFECTS    S122

LIFTING OBSRVATIONS IN
DETERMINED CLUSTERS BY
REPLACING CONCRETE OBJECTS WITH
VARIABLES    S123

FIG. 3

(S12 LEARNING INDIVIDUAL SKILLS FROM TRAINING DATA)

(EXTRACTING PRECONDITIONS FOR EACH DETERMINED EFFECT CLUSTER)

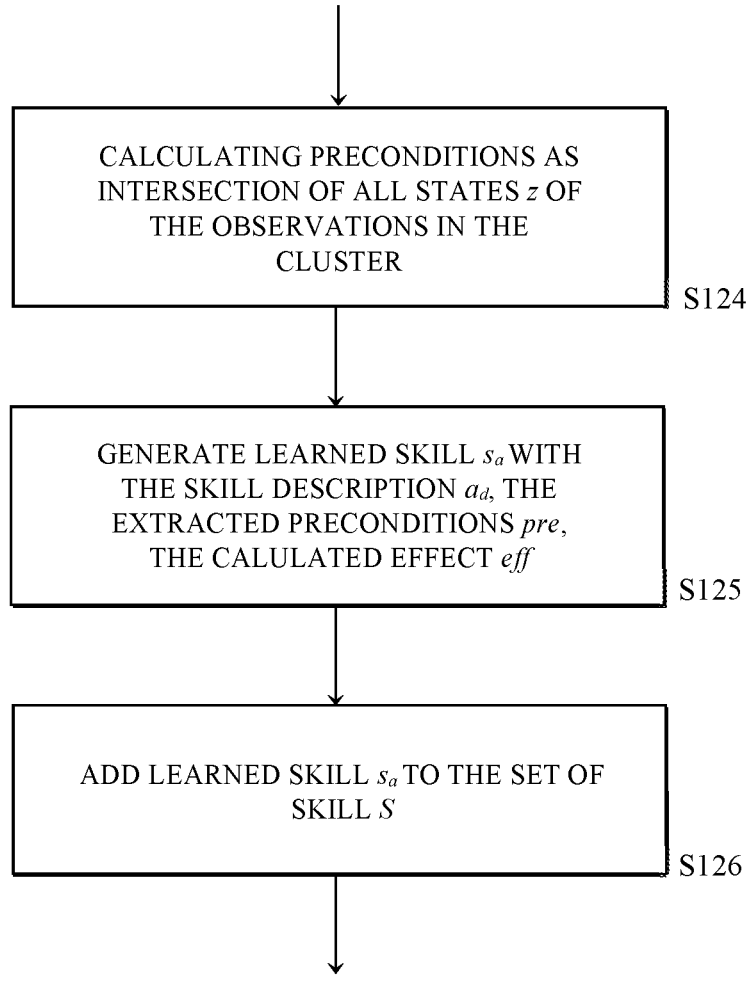

CALCULATING PRECONDITIONS AS INTERSECTION OF ALL STATES $z$ OF THE OBSERVATIONS IN THE CLUSTER

S124

GENERATE LEARNED SKILL $s_a$ WITH THE SKILL DESCRIPTION $a_d$, THE EXTRACTED PRECONDITIONS $pre$, THE CALULATED EFFECT $eff$

S125

ADD LEARNED SKILL $s_a$ TO THE SET OF SKILL $S$

(S12 LEARNING GENERALIZED SKILLS FROM TRAINING DATA $D$)

(ITERATIVELY GENERALIZING LEARNED INDIVIDUAL SKILLS UNTIL
CONVERGENCE CRITERION IS MET)

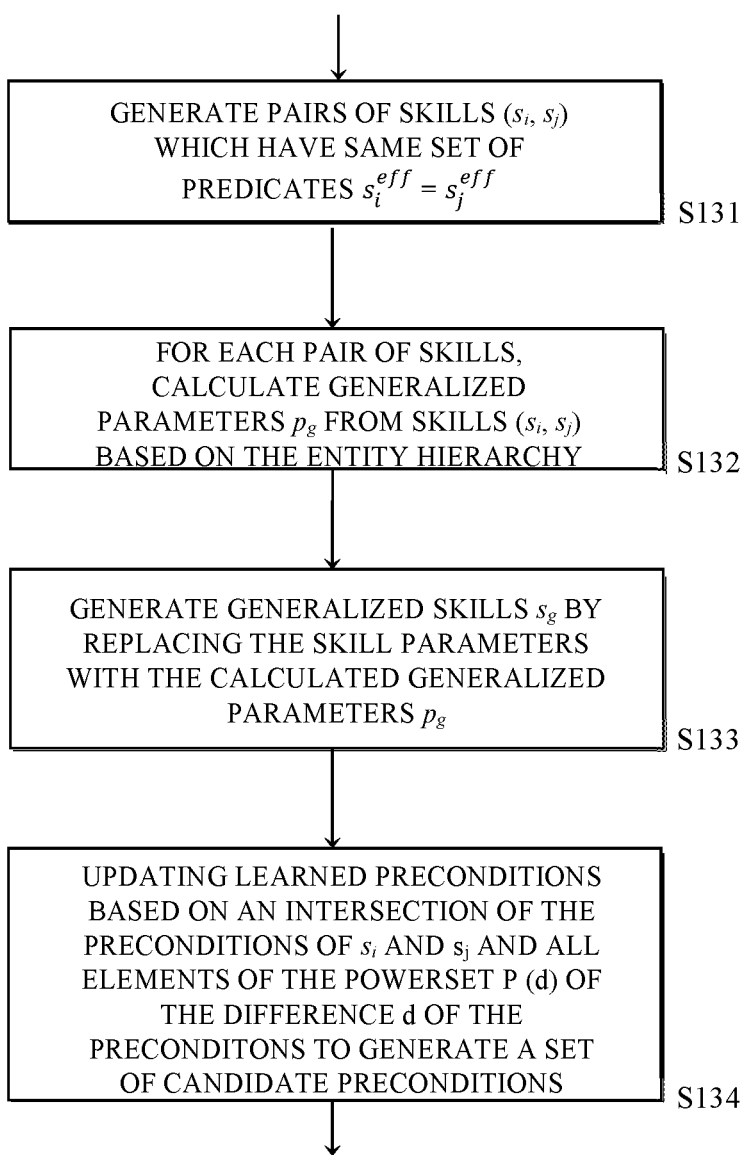

GENERATE PAIRS OF SKILLS $(s_i, s_j)$
WHICH HAVE SAME SET OF
PREDICATES $s_i^{eff} = s_j^{eff}$                    S131

FOR EACH PAIR OF SKILLS,
CALCULATE GENERALIZED
PARAMETERS $p_g$ FROM SKILLS $(s_i, s_j)$
BASED ON THE ENTITY HIERARCHY          S132

GENERATE GENERALIZED SKILLS $s_g$ BY
REPLACING THE SKILL PARAMETERS
WITH THE CALCULATED GENERALIZED
PARAMETERS $p_g$                                      S133

UPDATING LEARNED PRECONDITIONS
BASED ON AN INTERSECTION OF THE
PRECONDITIONS OF $s_i$ AND $s_j$ AND ALL
ELEMENTS OF THE POWERSET P (d) OF
THE DIFFERENCE d OF THE
PRECONDITONS TO GENERATE A SET
OF CANDIDATE PRECONDITIONS          S134

FIG. 5

(S12 LEARNING GENERALIZED SKILLS FROM TRAINING DATA $D$)

(ITERATIVELY GENERALIZING LEARNED INDIVIDUAL SKILLS UNTIL
THE CONVERGENCE CRITERION IS MET)

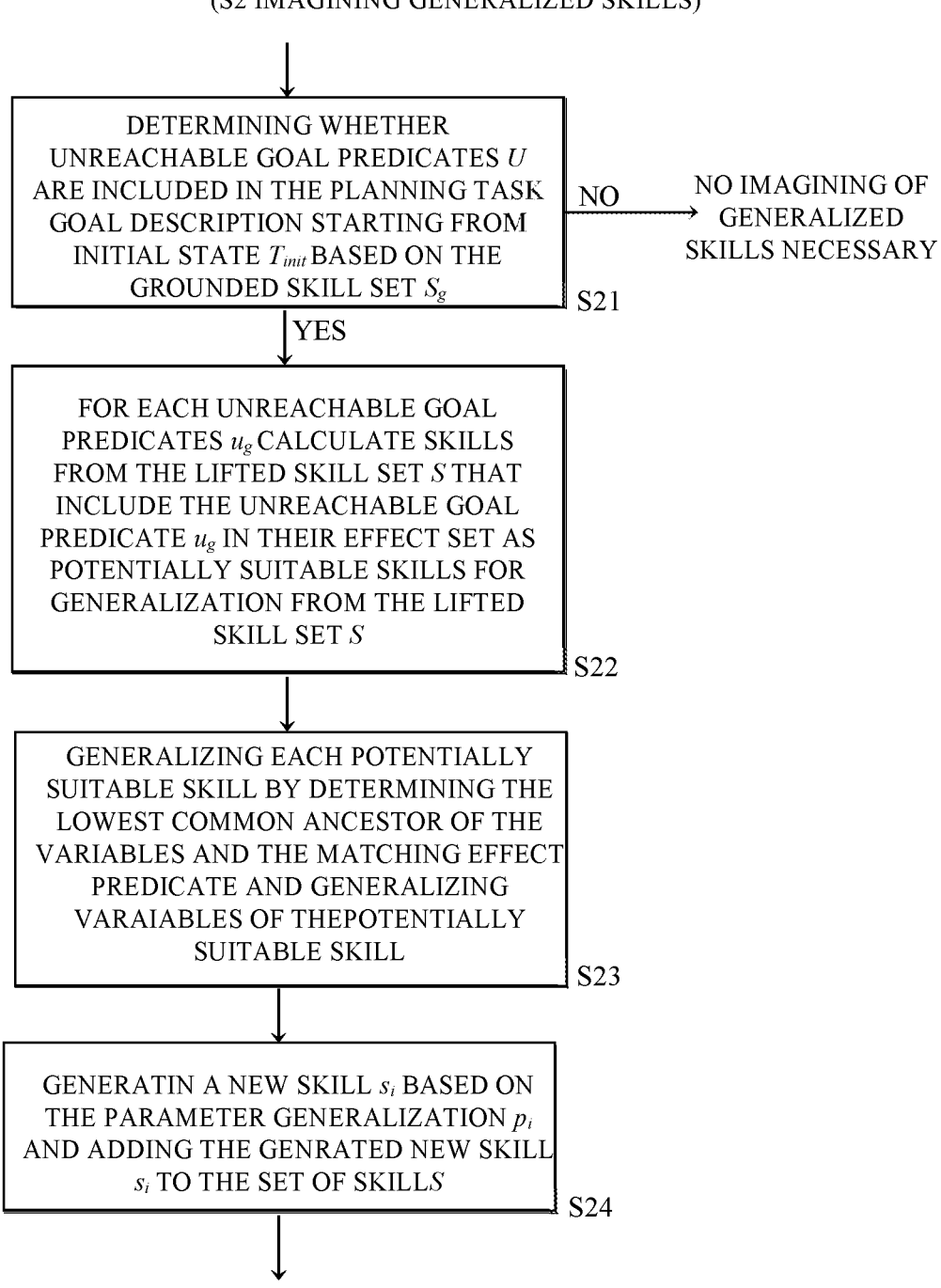

(S2 IMAGINING GENERALIZED SKILLS)

DETERMINING WHETHER UNREACHABLE GOAL PREDICATES $U$ ARE INCLUDED IN THE PLANNING TASK GOAL DESCRIPTION STARTING FROM INITIAL STATE $T_{init}$ BASED ON THE GROUNDED SKILL SET $S_g$

S21

NO → NO IMAGINING OF GENERALIZED SKILLS NECESSARY

YES

FOR EACH UNREACHABLE GOAL PREDICATES $u_g$ CALCULATE SKILLS FROM THE LIFTED SKILL SET $S$ THAT INCLUDE THE UNREACHABLE GOAL PREDICATE $u_g$ IN THEIR EFFECT SET AS POTENTIALLY SUITABLE SKILLS FOR GENERALIZATION FROM THE LIFTED SKILL SET $S$

S22

GENERALIZING EACH POTENTIALLY SUITABLE SKILL BY DETERMINING THE LOWEST COMMON ANCESTOR OF THE VARIABLES AND THE MATCHING EFFECT PREDICATE AND GENERALIZING VARAIABLES OF THEPOTENTIALLY SUITABLE SKILL

S23

GENERATIN A NEW SKILL $s_i$ BASED ON THE PARAMETER GENERALIZATION $p_i$ AND ADDING THE GENRATED NEW SKILL $s_i$ TO THE SET OF SKILL$S$

(S2 IMAGINING GENERALIZED SKILLS)

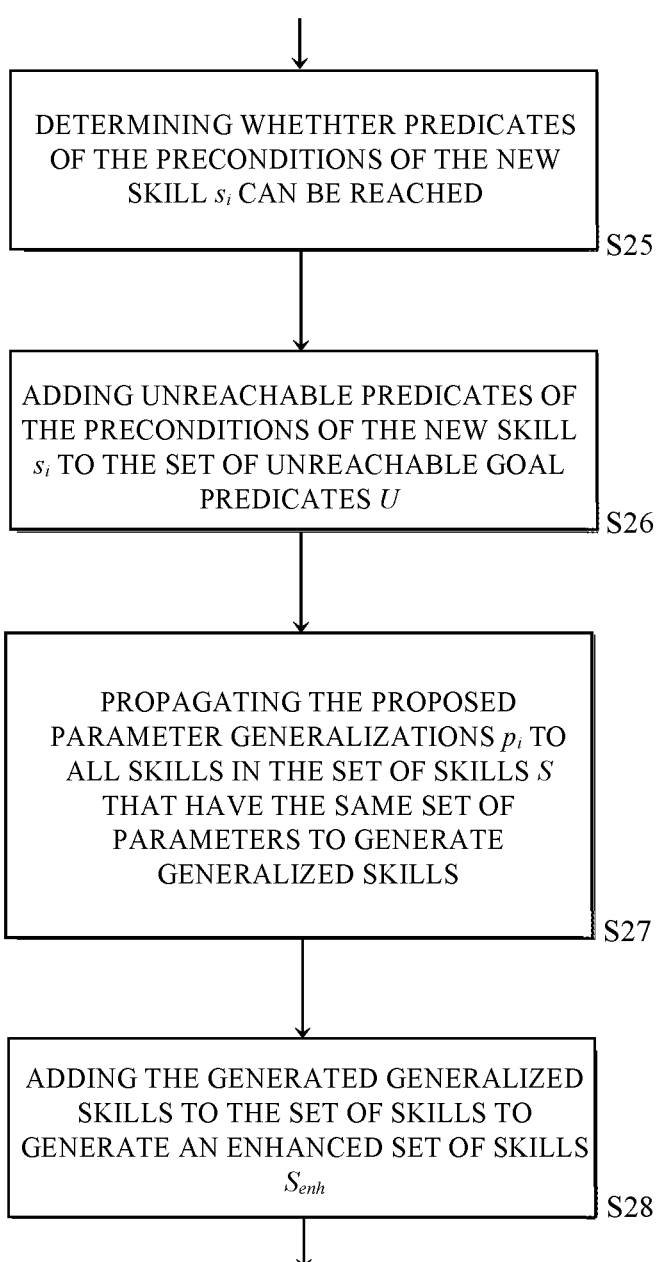

DETERMINING WHETHTER PREDICATES OF THE PRECONDITIONS OF THE NEW SKILL $s_i$ CAN BE REACHED

S25

ADDING UNREACHABLE PREDICATES OF THE PRECONDITIONS OF THE NEW SKILL $s_i$ TO THE SET OF UNREACHABLE GOAL PREDICATES $U$

S26

PROPAGATING THE PROPOSED PARAMETER GENERALIZATIONS $p_i$ TO ALL SKILLS IN THE SET OF SKILLS $S$ THAT HAVE THE SAME SET OF PARAMETERS TO GENERATE GENERALIZED SKILLS

S27

ADDING THE GENERATED GENERALIZED SKILLS TO THE SET OF SKILLS TO GENERATE AN ENHANCED SET OF SKILLS $S_{enh}$

| | | generalized+individual | | | generalized | | | individual | | |
|---|---|---|---|---|---|---|---|---|---|---|
| | | succ. (#p) | time (s) | \|p\| | succ. (#p) | time (s) | \|p\| | succ. (#p) | time (s) | \|p\| |
| S1 | T1.1 | 100 % (1) | 1.21 ± 0.03 | 5 | 100 % (1) | 1.07 ± 0.04 | 5 | 100 % (1) | 0.33 ± 0.03 | 5 |
| | T1.2 | 100 % (1) | 1.23 ± 0.02 | 5 | 100 % (1) | 1.05 ± 0.02 | 5 | 100 % (1) | 0.30 ± 0.02 | 5 |
| | T1.3 | 100 % (1) | 1.39 ± 0.03 | 15 | 100 % (1) | 1.20 ± 0.02 | 16 | 100 % (1) | 0.36 ± 0.02 | 15 |
| | T1.4 | 100 % (1) | 1.30 ± 0.01 | 10 | 100 % (1) | 1.16 ± 0.01 | 10 | 100 % (1) | 0.30 ± 0.03 | 10 |
| S2 | T2.1 | 100 % (1) | 1.20 ± 0.01 | 5 | 100 % (1) | 1.03 ± 0.02 | 5 | 100 % (1) | 0.33 ± 0.02 | 8 |
| | T2.2 | 100 % (1) | 1.30 ± 0.03 | 10 | 100 % (1) | 1.13 ± 0.01 | 10 | N/A | N/A | N/A |
| | T2.3 | 100 % (1) | 1.72 ± 0.03 | 20 | 100 % (1) | 1.55 ± 0.02 | 20 | N/A | N/A | N/A |
| | T2.4 | 100 % (1) | 12.61 ± 0.78 | 30 | 100 % (1) | 14.20 ± 0.26 | 30 | N/A | N/A | N/A |
| S3 | T3.1 | 100 % (1) | 1.09 ± 0.02 | 5 | 100 % (1) | 1.03 ± 0.03 | 5 | N/A | N/A | N/A |
| | T3.2 | 100 % (1) | 1.11 ± 0.01 | 5 | 100 % (1) | 1.15 ± 0.09 | 5 | N/A | N/A | N/A |
| | T3.3 | 100 % (1) | 1.20 ± 0.01 | 10 | 100 % (1) | 1.18 ± 0.04 | 10 | N/A | N/A | N/A |
| | T3.4* | 100 % (1) | 1.94 ± 0.03 | 10 | 100 % (1) | 1.80 ± 0.02 | 10 | N/A | N/A | N/A |
| | T3.5* | 100 % (1) | 2.36 ± 0.03 | 15 | 100 % (1) | 2.09 ± 0.06 | 15 | N/A | N/A | N/A |
| | T3.6* | 100 % (1) | 4.94 ± 0.06 | 25 | 100 % (1) | 4.65 ± 0.14 | 25 | N/A | N/A | N/A |
| | T3.7* | 100 % (1) | 14.23 ± 0.22 | 30 | 100 % (1) | 14.40 ± 0.81 | 30 | N/A | N/A | N/A |
| S4 | T4.1* | 100 % (1) | 2.25 ± 0.02 | 15 | 100 % (1) | 2.08 ± 0.06 | 15 | N/A | N/A | N/A |
| | T4.2* | 100 % (1) | 12.72 ± 0.19 | 30 | 100 % (1) | 13.74 ± 0.29 | 30 | N/A | N/A | N/A |
| | T4.3* | 100 % (1) | 1.95 ± 0.11 | 10 | 100 % (1) | 1.79 ± 0.11 | 10 | N/A | N/A | N/A |
| | T4.4* | 100 % (1) | 2.08 ± 0.03 | 15 | 100 % (1) | 1.94 ± 0.02 | 15 | N/A | N/A | N/A |
| | T4.5* | 100 % (1) | 4.42 ± 0.08 | 25 | 100 % (1) | 4.43 ± 0.02 | 25 | N/A | N/A | N/A |
| | T4.6* | 100 % (1) | 13.27 ± 0.11 | 30 | 100 % (1) | 15.00 ± 0.12 | 30 | N/A | N/A | N/A |
| S5 | T5.1* | 100 % (2) | 2.08 ± 0.06 | 5 | 100 % (2) | 1.92 ± 0.06 | 5 | N/A | N/A | N/A |
| | T5.2* | 100 % (2) | 2.23 ± 0.05 | 10 | 100 % (2) | 2.13 ± 0.05 | 10 | N/A | N/A | N/A |
| | T5.3* | 100 % (3) | 3.84 ± 0.06 | 15 | 100 % (3) | 3.63 ± 0.03 | 15 | N/A | N/A | N/A |
| | T5.4* | 100 % (3) | 37.14 ± 0.31 | 30 | 100 % (3) | 49.28 ± 0.73 | 30 | N/A | N/A | N/A |
| | T5.5* | 100 % (3) | 12.50 ± 0.09 | 25 | 100 % (3) | 13.17 ± 0.10 | 25 | N/A | N/A | N/A |
| | T5.6* | 100 % (3) | 40.54 ± 0.36 | 30 | 100 % (3) | 46.19 ± 0.52 | 30 | N/A | N/A | N/A |
| S6 | T6.1* | 100 % (2) | 2.05 ± 0.11 | 5 | 100 % (2) | 1.98 ± 0.05 | 5 | N/A | N/A | N/A |
| | T6.2* | 100 % (2) | 2.01 ± 0.07 | 5 | 100 % (2) | 1.98 ± 0.04 | 5 | N/A | N/A | N/A |
| | T6.3* | 100 % (2) | 7.36 ± 0.08 | 26 | 100 % (2) | 9.51 ± 0.11 | 26 | N/A | N/A | N/A |

Figure 12:
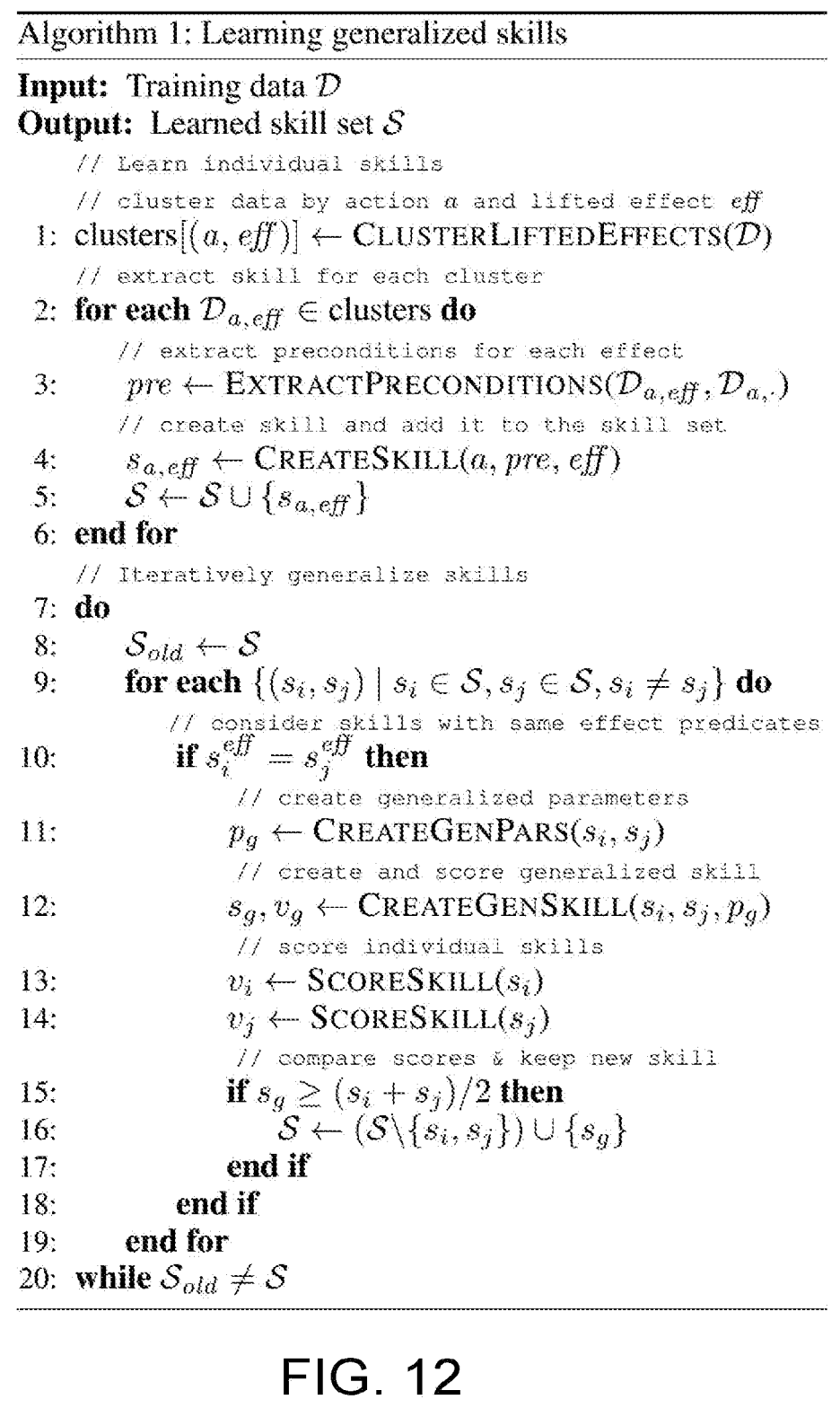

Algorithm 1: Learning generalized skills

---

Input: Training data $\mathcal{D}$
Output: Learned skill set $\mathcal{S}$ // Learn individual skills
    // cluster data by action $a$ and lifted effect $\textit{eff}$ 1: clusters$[(a, \textit{eff})] \leftarrow$ CLUSTERLIFTEDEFFECTS$(\mathcal{D})$
    // extract skill for each cluster 2: for each $\mathcal{D}_{a,\textit{eff}} \in$ clusters do
        // extract preconditions for each effect 3:     $\textit{pre} \leftarrow$ EXTRACTPRECONDITIONS$(\mathcal{D}_{a,\textit{eff}}, \mathcal{D}_{a,.})$
        // create skill and add it to the skill set 4:     $s_{a,\textit{eff}} \leftarrow$ CREATESKILL$(a, \textit{pre}, \textit{eff})$ 5:     $\mathcal{S} \leftarrow \mathcal{S} \cup \{s_{a,\textit{eff}}\}$ 6: end for
    // Iteratively generalize skills 7: do

8:     $\mathcal{S}_{old} \leftarrow \mathcal{S}$

9:     for each $\{(s_i, s_j) \mid s_i \in \mathcal{S}, s_j \in \mathcal{S}, s_i \neq s_j\}$ do
        // consider skills with same effect predicates 10:         if $s_i^{\textit{eff}} = s_j^{\textit{eff}}$ then
            // create generalized parameters 11:             $p_g \leftarrow$ CREATEGENPARS$(s_i, s_j)$
            // create and score generalized skill 12:             $s_g, v_g \leftarrow$ CREATEGENSKILL$(s_i, s_j, p_g)$
            // score individual skills 13:             $v_i \leftarrow$ SCORESKILL$(s_i)$ 14:             $v_j \leftarrow$ SCORESKILL$(s_j)$
            // compare scores & keep new skill 15:             if $s_g \geq (s_i + s_j)/2$ then

16:                 $\mathcal{S} \leftarrow (\mathcal{S} \backslash \{s_i, s_j\}) \cup \{s_g\}$ 17:             end if

18:         end if

19:     end for

20: while $\mathcal{S}_{old} \neq \mathcal{S}$

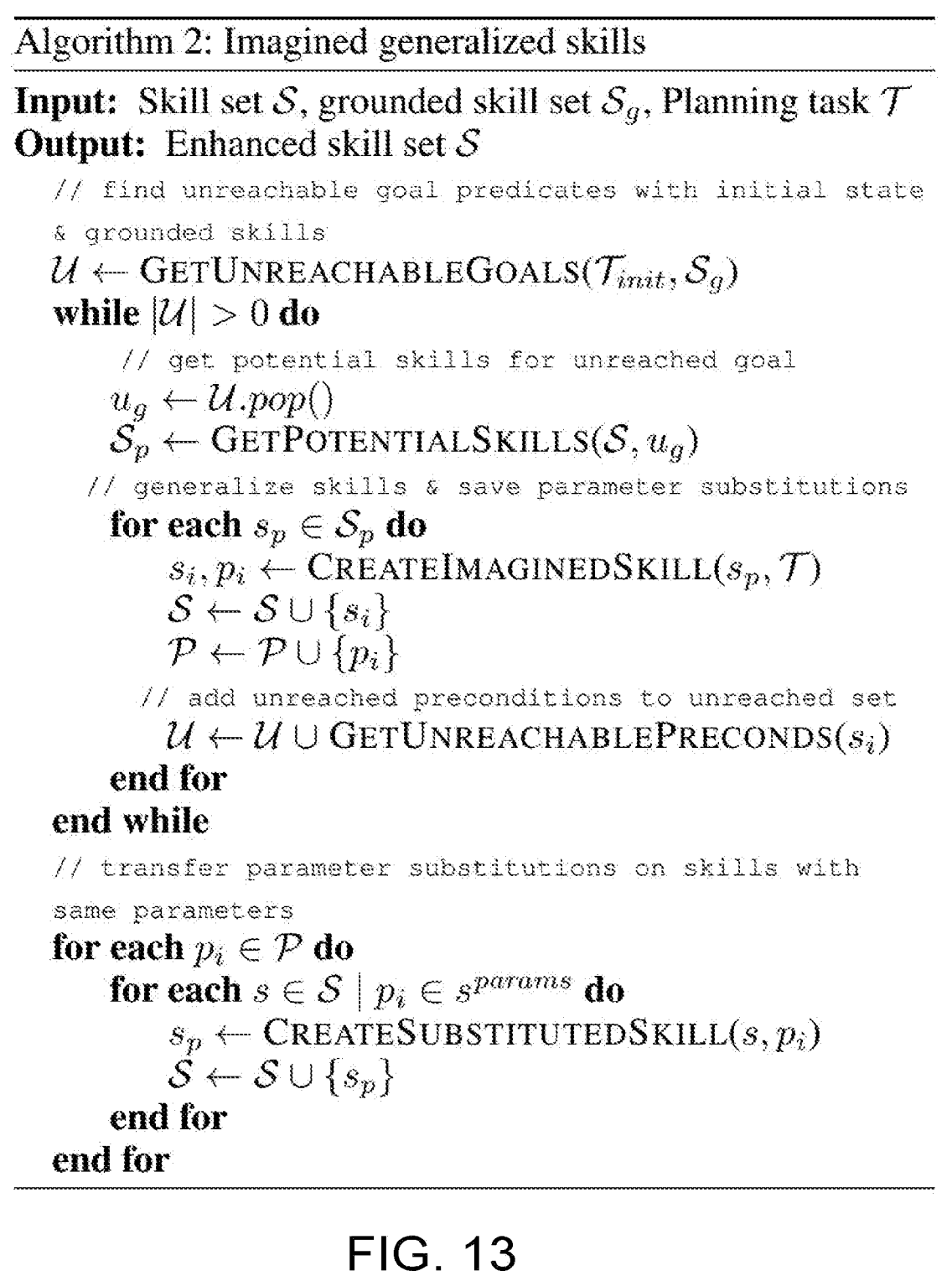

Algorithm 2: Imagined generalized skills

Input: Skill set $\mathcal{S}$, grounded skill set $\mathcal{S}_g$, Planning task $\mathcal{T}$
Output: Enhanced skill set $\mathcal{S}$ // find unreachable goal predicates with initial state & grounded skills
    $\mathcal{U} \leftarrow \text{GETUNREACHABLEGOALS}(\mathcal{T}_{init}, \mathcal{S}_g)$
    while $|\mathcal{U}| > 0$ do
        // get potential skills for unreached goal
        $u_g \leftarrow \mathcal{U}.pop()$
        $\mathcal{S}_p \leftarrow \text{GETPOTENTIALSKILLS}(\mathcal{S}, u_g)$
        // generalize skills & save parameter substitutions
        for each $s_p \in \mathcal{S}_p$ do
            $s_i, p_i \leftarrow \text{CREATEIMAGINEDSKILL}(s_p, \mathcal{T})$
            $\mathcal{S} \leftarrow \mathcal{S} \cup \{s_i\}$
            $\mathcal{P} \leftarrow \mathcal{P} \cup \{p_i\}$
            // add unreached preconditions to unreached set
            $\mathcal{U} \leftarrow \mathcal{U} \cup \text{GETUNREACHABLEPRECONDS}(s_i)$
        end for
    end while
    // transfer parameter substitutions on skills with same parameters
    for each $p_i \in \mathcal{P}$ do
        for each $s \in \mathcal{S} \mid p_i \in s^{params}$ do
            $s_p \leftarrow \text{CREATESUBSTITUTEDSKILL}(s, p_i)$
            $\mathcal{S} \leftarrow \mathcal{S} \cup \{s_p\}$
        end for
    end for

FIG. 13

LEARNING TYPE-GENERALIZED SKILLS FOR SYMBOLIC PLANNING FOR AUTONOMOUS DEVICES

CROSS-REFERENCE TO RELATED APPLICATION

This application claims the priority benefit of European application serial no. 22189050.2, filed on Aug. 5, 2022, and European application serial no. 23155823.0, filed on Feb. 9, 2023. The entirety of each of the above-mentioned patent applications is hereby incorporated by reference herein and made a part of this specification.

TECHNICAL FIELD OF THE DISCLOSURE

The disclosure relates to the general field of robotics and autonomous devices. In particular, a method and a system for learning operators for planning of a complex behavior of autonomous devices, and a corresponding autonomous device are proposed.

TECHNICAL BACKGROUND

Robotic systems including autonomous devices (robot, autonomous agent, agent) will become increasingly common in future environments. An autonomous device may act as a robot companion at home, providing help in the kitchen to a human (user). In order to help with preparing meals, the robot needs to have the capability to perform actions using different tools and to interact with a variety of further objects. In a kitchen scenario, the robot requires knowledge what effects performed actions have on food, for example. However, the user having to demonstrate all possible objects the autonomous devices may encounter and even the most relevant combinations of objects required for performing a task in the task environment would be time consuming, thus hindering acceptance of such autonomous device.

In order for embodied intelligent agents like the autonomous device to solve complex tasks over an extended time horizon, the autonomous device needs a capability to automatically plan into the future. The autonomous device requires having an abstract model of the task environment, knowledge on its abilities, the available actions and objects involved in addressing a task, and knowledge on the task to be addressed (Tenenbaum et al., 2011; Lake et al., 2017; Konidaris, 2019). The task of automated planning (AP) is a branch of Artificial Intelligence pivoted on the formulation of a plan: a series of actions guiding the transition of a system, e.g. the autonomous device, from an initial state of the system to the target state, and accomplishing a task (goal) in the process. Applying an action to a particular world state requires a certain number of preconditions to be fulfilled. Performing each action changes the world state with the induced effects of the action. Action models may represent the actions: the blueprints of the domain-specific actions. This idea is the core of classical artificial intelligence planning, or symbolic planning, and has a research history (Arora et al., 2018). Usually, for autonomous systems and applications using symbolic planning the required representations of the task environment, of states and of actions, are domain-specific and are laboriously hand-designed by experts.

Symbolic planning is a powerful technique to solve complex tasks that require long sequences of skills and can provide an intelligent agent with a complex behavior. The disadvantage of a symbolic planning approach is the requirement for suitable symbolic representations describing the states of the environment as well as the skills that can change the state of the environment. Currently, such representations are carefully hand-designed by domain experts specifically to distinct problem domains, which limits the application of symbolic planning approaches and a complexity of the task environment the autonomous device may cope with.

Taking the discussed considerations into account, the problem of efficiently learning symbolic planning actions for autonomous devices from few observations with known state representations for a plurality of varying situations and tasks is to be addressed.

SUMMARY

The method according to the first aspect defined in claim 1 and the system according to the second aspect defined in the corresponding independent claim provide an advantageous solution to the problem.

The computer-implemented method for learning operators for planning a behavior of an autonomous device according to the first aspect comprises steps of: obtaining a set of training data D including observations of a plurality of skills executable by the autonomous device in an interaction with at least one entity for addressing a first task; obtaining a set of predetermined data defining a hierarchy of entities including the at least one entity; learning a set of individual skills based on the obtained set of training data D; generating an enhanced set of skills by generalizing the individual skills of the learned set of individual skills based on the predetermined set of data that defines the hierarchy of entities and adding the generalized individual skills to the inset of individual skills; and performing behavior planning of the autonomous device for addressing a second task different from the first task based on the enhanced set of skills.

BRIEF DESCRIPTION OF THE DRAWINGS

The aspects and implementation of the present disclosure will be explained in the following description of specific embodiments in relation to the enclosed drawings.

FIG. 3 shows a second flowchart that illustrates simplified steps of learning individual skills from training data, in particular performing clustering of lifted effects in a process of learning a generalized behavior.

FIG. 4 shows a third flowchart that illustrates simplified steps of learning individual skills from training data, in particular extracting preconditions for each determined effect cluster in a process of learning a generalized behavior.

FIG. 5 shows a fourth flowchart that illustrates simplified steps of learning individual skills from training data, in particular iteratively generalizing learned individual skills until a convergence criterion is met in a process of learning a generalized behavior.

FIG. 7 shows a sixth flowchart illustrating an overview over a process of imagining generalized skills.

FIG. 8 shows a seventh flowchart continuing with the overview over the process of imagining generalized skills from FIG. 7.

FIG. 9 illustrates a specific application scenario of the method for planning a behavior of an autonomous device in a kitchen environment including an agent and a plurality of entities the agent may interact with.

FIG. 11 displays a table illustrating an evaluation of learned skills in different sets of planning tasks in an exemplary application of a planning process for an agent.

FIG. 12 shows a program structure in pseudo-code of an embodiment of the process of learning generalized skills.

FIG. 13 shows a program structure in pseudo-code of an embodiment of the process of imagining generalized skills.

Figure 1:
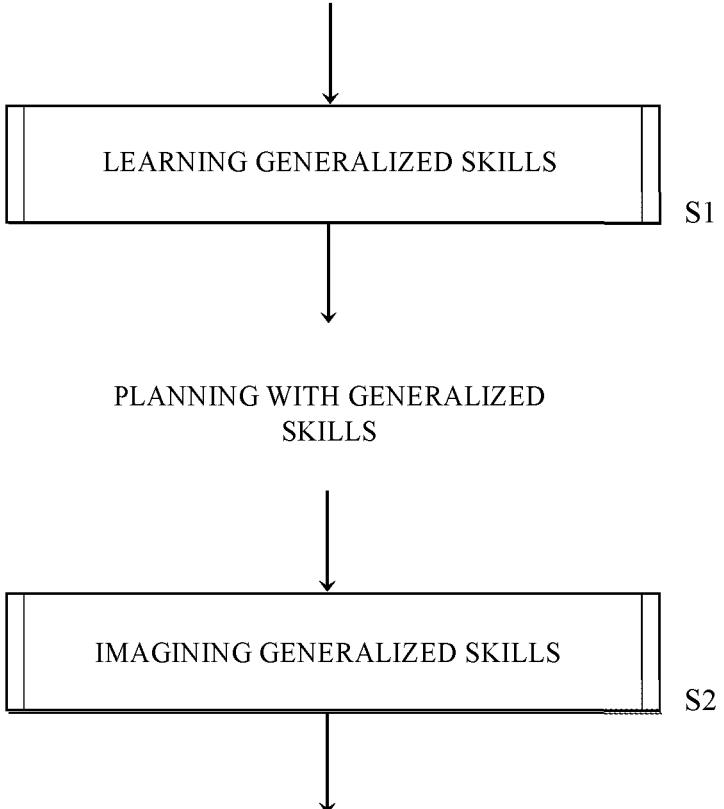
FIG. 1 illustrates elementary processes included in a method for planning a behavior of an autonomous device.

The description of figures uses same references numerals for same or corresponding elements in different figures. The description of figures dispenses with a detailed discussion of same reference numerals in different figures whenever considered possible without adversely affecting comprehensibility.

DETAILED DESCRIPTION

The method according to the first aspect defines a process for generating type-generalized actions and provides a framework for generating type-generalized actions from observing a similar behavior of entities and a given entity hierarchy. The framework facilitates learning a behavior of the autonomous device from fewer observations in the training data D, transfer of the learned behavior to different entities than those entities used in the training data D and to different scenarios and new situations than those covered in the training data D.

The method enables a process for symbolic planning of skills from few observations with known state representations. More precise, the method learns type-generalized skills that can transfer to a variety of novel situations and entities, instead of object-type specific skills. Type-generalization is a powerful concept that allows a straightforward transfer to unknown situations and entities based on similar behavior and the entity hierarchy.

The term "skill" denotes a symbolic representation of an action, a procedure, a step, for example, which the autonomous device can perform. A skill comprises parameters that describe the involved entities when executing the skill, a set of preconditions that must be fulfilled in order that the skill is executable in a certain state of the task environment, and a set of effects that describe how the execution of the skill changes the state of the task environment from an initial state to a resulting state of the environment.

The term "entity" includes objects, autonomous devices, agents, etc. that can occur in a domain, e.g., the task environment.

The task environment denotes a space in which the autonomous device may move or which the autonomous device may physically interact with manipulators of the autonomous device.

The term "grounded" describes parameters of skills that are bound to a specific entity.

The term "lifted" describes parameters of skills if there are not instantiated with a specific entity.

The features of the dependent claims define further advantageous embodiments.

The method according an embodiment includes performing the step of generating an enhanced set of skills by generalizing the learned set of individual skills based on the predetermined set of data repetitively until a convergence criterion is met. The method determines that the convergence criterion is met when, in the step of generalizing the learned set of individual skills, no new generalized skill can be identified.

According to an embodiment of the method, the step of learning a set of individual skills based on the obtained set of training data includes: calculating, for each demonstration tuple (s, a, s') of the training data D, a grounded effect by calculating a difference between an initial state s and a resulting state s; clustering the demonstration tuples (s, a, s') based on the skill a and the calculated grounded effects into effect clusters; and lifting the demonstration tuples (s, a, s') included in each of the effect clusters by replacing the at least one entity with at least one variables that includes the at least one entity.

The method according an embodiment includes in the step of learning a set of individual skills based on the obtained set of training data extracting preconditions for each of the determined effect clusters.

According to an embodiment of the method, the step of learning a set of individual skills based on the obtained set of training data further includes: calculating preconditions as the intersection of all initial states s of the demonstration tuples (s, a, s') in each of the determined effect clusters, generating a learned individual skill including the skill a, the calculated preconditions, the calculated effect, associated with the learned individual skill, and adding the learned individual skill to the set of individual skills S.

According to an embodiment of the method, the step of repeatedly performing the step of generating the enhanced set of skills by generalizing the individual skills of the learned set of individual skills based on the predetermined set of data includes: generating pairs of skills $(s_i, s_j)$ with similar effects from the set of individual skills to generate possible variable type generalizations, calculating generalized parameters $p_g$ from the skills $(s_i, s_j)$ based on the predetermined det of data defining the hierarchy of entities for each of the generated pairs of skills $(s_i, s_j)$, generating the generalized skill $s_g$ by replacing skill parameters of the generated pairs of skills $(s_i, s_j)$ with the calculated generalized parameters $p_g$, updating learned preconditions of based on an intersection of the preconditions of $s_i$ and $s_j$, and based on all elements of a powerset ($P(\bullet)$) of the difference of their preconditions to generate a set of candidate preconditions based on $$\{(s_i^{pre} \cap s_j^{pre}) \cup \text{pre} \mid \text{pre} \in P(d)\};$$

with $$d = (s_i^{pre} \cup s_j^{pre}) - (s_i^{pre} \cap_j^{pre})$$

calculating a score $v_g$ as a Recall based on demonstration clusters from $s_i$ and $s_j$, calculating a score $v_i$ as a Recall based on the demonstration clusters from $s_i$, calculating a score $v_j$ as a recall based on the demonstration clusters from $s_j$, and determining whether replacing the individual skills $s_i$ and $s_j$, by the generalized skill $s_g$ based on the calculated scores $v_g$ and $v_i$ and $v_j$.

The method may determine to replace the individual skills $s_i$ and $s_j$, by the generalized skill $s_g$, which is the generalized skill with the preconditions from the precondition candidates that has the highest score $s_g$, in case of determining that a performance of the generalized skill $s_g$ is equal to or exceeds an average performance of the individual skills $s_i$ and $s_j$.

The method may determine to replace the individual skills $s_i$ and $s_j$, by the generalized skill $s_g$ in case of determining that the expression $$v_g \geq \frac{v_i + v_j}{2}.$$

is true.

According to an embodiment of the method, the step of performing behavior planning of the autonomous device for addressing the second task different from the first task based on the generalized set of skills further includes determining whether unreachable goal predicates U exist by calculating predicates in an obtained planning task goal description that cannot be reached with the enhanced set of skills starting from an initial state s.

According to an embodiment, the method may, in case of determining that unreachable goal predicates U exist that cannot be reached with the enhance set of skills starting from an initial state s, perform the step of performing behavior planning of the autonomous device for addressing the second task different from the first task further including: calculating repetitively for each unreachable goal predicate $u_g$ potentially suitable skills for generalization from the enhanced set of skills, wherein the potentially suitable skills have the unreachable goal predicate $u_g$ in their effect set, generalizing each potentially suitable skill by determining a lowest common ancestor of variables in the unreachable goal predicate $u_g$ and a matching effect predicate of the potentially suitable skill, generalizing variables of the potentially suitable skill to a lowest common ancestor of itself and the available objects in the planning task to generate a parameter generalization $p_i$, generating a new skill $s_i$ with the parameter generalization $p_i$, and added to the enhanced set of skills, determining whether predicates in the preconditions of the generated new skill $s_i$ can be reached, and adding determined unreachable predicates to the set of unreachable goal predicates U, propagating the proposed parameter generalizations $p_i$ to all skills that have a same set of parameters to generate further generalized skills and adding the further generalized skills to generate the enhanced skill set S, and resuming performing behavior planning of the autonomous device (2) for addressing the second task based on the enhanced skill set S.

In addition to learning the generalized skills from few observations based on a given entity hierarchy in the obtained data and the observed similar behavior, the method may be integrated in a standard search based heuristic planning process that imagines new generalized skill proposals while executing the planning of the behavior of the autonomous device. These learned and imagined lifted generalized skills can be grounded with available objects in the concrete planning problem.

In particular, the method can propose additional type-generalized skills during an ongoing planning process of a behavior of the autonomous device, which have not been demonstrated or learned before. This provides an improved flexibility of the autonomous device to deal with entities including objects not fitting in the learned skills so far, to deal with an unexpected behavior of previously known entities, and a pro-active behavior of the autonomous device by proposing novel skills derived from the type-generalized skills on the fly.

The method of an embodiment comprises generating a control signal for controlling at least one actuator of the autonomous device to perform the second task based on the determined behavior, and outputting the generated control signal to the at least one actuator.

A program according to an aspect comprises instructions, which, when the program is executed by a computer or digital signal processor, cause the computer or digital signal processor to carry out the method according to the first aspect.

A system for learning operators for planning a behavior of an autonomous device for solving a predefined task according to the second aspect comprises a first acquisition unit configured to obtain a set of training data D including observations of a plurality of skills executable by the autonomous device in an interaction with at least one entity for addressing a first task. The system further comprises a second acquisition unit configured to obtain a predetermined set of data defining a hierarchy of entities including the at least one entity, and a processor. The processor is configured to learn a set of individual skills based on the obtained set of training data D. The processor is further configured to generate an enhanced set of skills by generalizing the learned set of individual skills based on the predetermined set of data that defines the hierarchy of entities and add them to the set of skills, and to perform behavior planning of the autonomous device for addressing a second task different from the first task based on the enhanced set of skills.

The first acquisition unit and the second acquisition unit may be implemented in software running on hardware on a computer including at least one processor and a memory, as well as interfaces for acquiring data and outputting data. The computer may form part of a robotic system. The computer may also include the processor for learning the set of individual skills, and generating the set of generalized skills.

According to an aspect, a robotic system comprises the system for planning a behavior of an autonomous device for solving a predefined task according to the second aspect and at least one autonomous device.

In recent years some research has tackled the problem of learning the required symbolic representations, especially in the robot learning, and task and motion planning (TAMP) communities. Often, hand-designed representations are used (Zhu et al. 2021; Garrett et al. 2021).

Many approaches can be divided between two general categories. A first category focusses on learning the action representation assuming a known state representation, e.g., given as known logical predicates (Pasula et al, 2007; Mitrevski et al 2020; Kim et al, 2020; Lamanna et al. 2021; Silver et al. 2021). A second category of research tackles the problem of learning a symbolic state representation, either additionally or separately, from raw sensor input (Kulick et al. 2013; Ahmadzadeh et al. 2015; Aksoy et al. 2016; Asai and Fukunaga 2018; Konidaris, Kaelbling, and Lozano-Perez 2018; Yuan et al., 2021; Chitnis et al., 2021; Cingilioglu et al, 2021).

The proposed processes tackle learning of the symbolic skills and how learned symbolic skills may further be generalized using a given entity hierarchy. After discussing details of processing embodiments of the approach, a simulated grid-based kitchen environment is discussed in order to show that type-generalized skills can be learned from few human demonstrations and with an additional on-the-fly generalization during planning, completely novel tasks involving novel entities can be solved.

FIG. 1 illustrates elementary processes included in a method for planning a behavior of an autonomous device.

The elementary processes include a process of learning generalized skills, which is summarized in the first algorithm discussed with reference to flowcharts of FIGS. 2 to 6 and also shown in pseudocode in a program chart in FIG. 13 from demonstrations.

Figure 14:
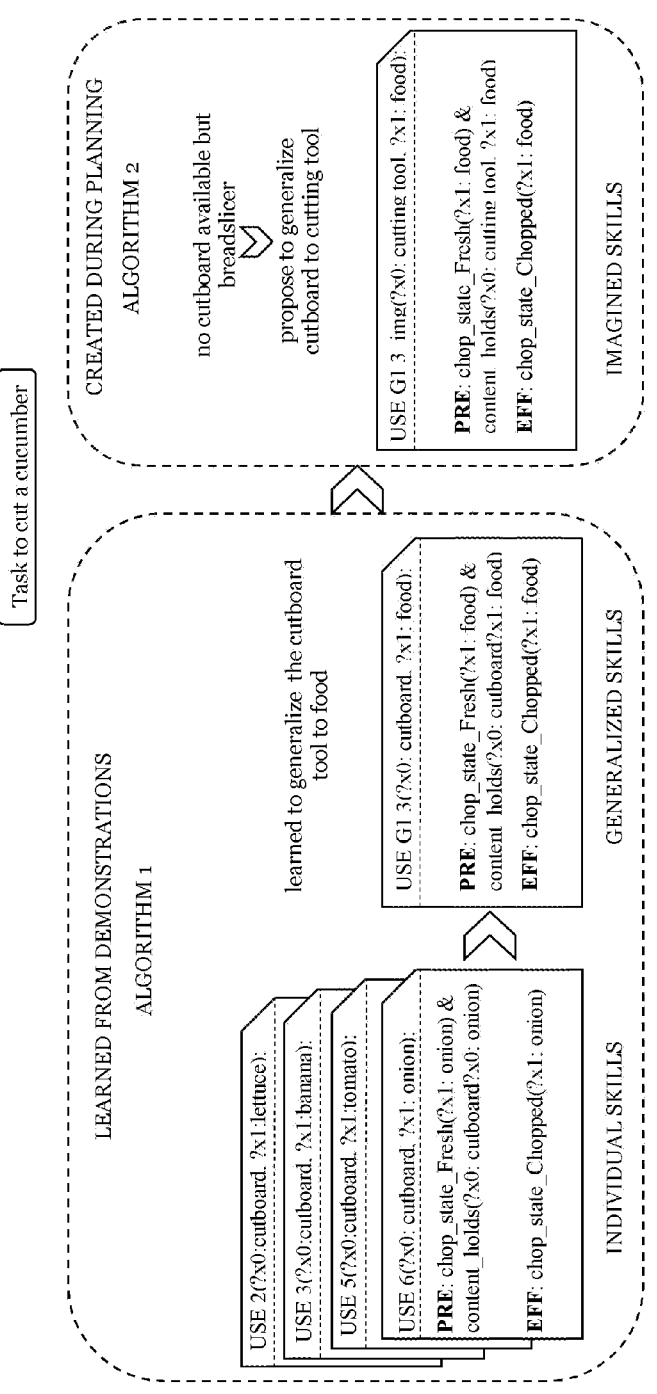
FIG. 14 illustrates an overview of the processes of learning generalized skills and imagining generalized skills in an application scenario.

The elementary processes further include a process of generating imagined generalized skills on demand during a planning phase, which is summarized in the second algorithm shown in a program chart in pseudo code in FIG. 14.

The description uses the Planning Domain Definition Language (PDDL), as discussed, e.g., in (Fox et al., 2003).

The term "skill" refers to a symbolic description of actions an autonomous device (agent) can perform in a task environment (environment) and which can be used for performing symbolic planning. The symbolic description of a skill comprises parameters, preconditions that must be fulfilled in order to be able to execute the skill, and effects the executed skill implies.

The term "parameters" refers to typed placeholders for objects that are used in the preconditions and effects.

The term "preconditions" are lifted logical predicates that must be fulfilled in the current state in order to execute the skill, and the effect describes the lifted logical predicates that change due to executing the skill.

The skills can be grounded by assigning the placeholder parameters (lifted) specific objects in the current environment and passing these substitutions to the preconditions and effects. In a specific example, e.g., a lifted predicate like i. content holds(?x0:cutboard, ?x1:food)

describes that an object of the type "food" needs to be the content of an object of type "cutboard" and can be grounded in a given environment with all suitable objects into ii. content holds(cutboard 1:cutboard, tomato 1:tomato), iii. content holds(cutboard 2:cutboard, onion 1:onion), iv. content holds(cutboard 1:cutboard, onion 2:onion), for example. The demonstrations in the training data D are grounded observations. The learned skills are lifted to transfer to other objects.

Figure 2:
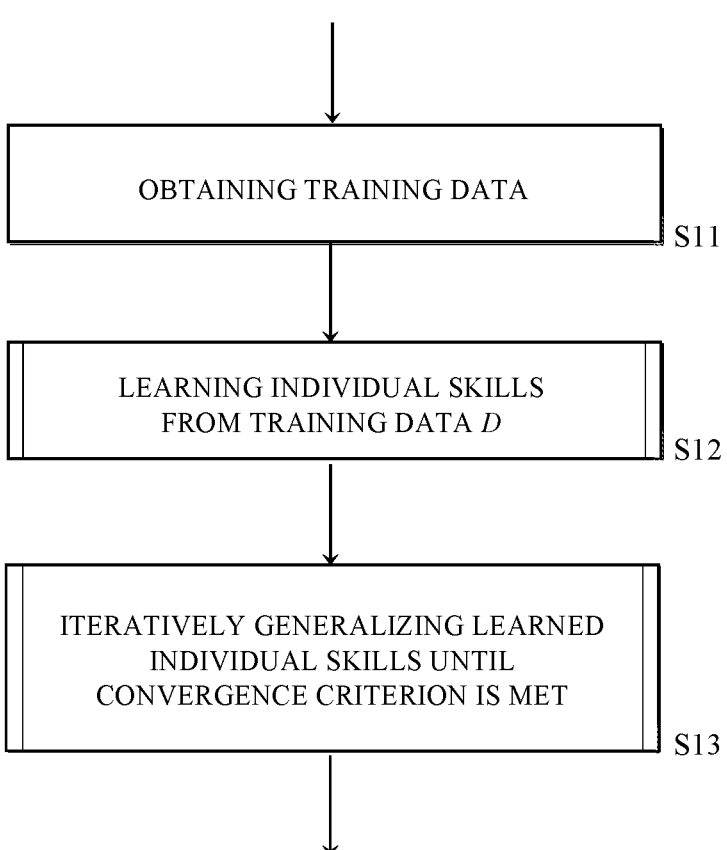
FIG. 2 shows a first flowchart illustrating an overview over a process of learning generalized skills.

FIG. 2 shows a first flowchart illustrating an overview over the (first) process of learning generalized skills.

Learning of generalized skills is done from human demonstrations. Each demonstration comprises a sequence of (s, a, s') tuples. The initial state s is the state before an action a (skill) was executed, and the resulting state s' the state after executing the skills. In a step S11, the method obtains training data D. The training data D comprises data on a plurality of demonstrations.

After obtaining the training data D in step S11, the process S1 of learning generalized skills proceeds with two phases. In step S12 (first phase), individual skills are learned from the training data D. In step S13 (second phase) following step S12, the learned individual skills are iteratively generalized until convergence in order to generate the generalized skills.

The learning of individual skills in step S12 may be based on the LOFT algorithm (Silver et al., 2021).

Given the training data D obtained in step S11, a set of skills S is to be learned. The first phase consists of three main steps, described in detail next with reference to the flowchart of FIG. 3, and learns the individual skills from the training data D. The first phase includes the function ClusterLiftedEffects of the algorithm shown in FIG. 12.

In the sequence of steps S121 to S123, the function ClusterLiftedEffects first calculates, for each demonstration tuple (s, a, s'), in the training data D the grounded effect by calculating a difference between state s and state s' in step S121.

FIG. 3 shows a second flowchart that illustrates simplified steps of learning individual skills from training data, in particular performing clustering of lifted effects in a process of learning a generalized behavior.

In step S122, the demonstration tuples (s, a, s') are subsequently clustered by the skill a and their respective effects. Two demonstration tuples (s, a, s') of the same skill belong to a same cluster if the respective calculated effects can be unified. Unifying of effects means that there exists a bijective mapping between the objects in the two demonstration tuples (s, a, s') such that the effects are equivalent up to this bijective mapping. This means the two demonstration tuples (s, a, s') of the same skill have a similar effect. In step S123 following step S122, the demonstration tuples (s, a, s') included in each effect cluster are then lifted. Lifting the demonstration tuples (s, a, s') included in one effect cluster may mean replacing concrete objects (the at least one entity) with variables, in particular replacing the concrete objects with a variable including the concrete objects.

FIG. 4 shows a third flowchart that illustrates simplified steps of the process of step S12 of learning individual skills from the training data D, in particular extracting preconditions for each determined effect cluster in a process of learning a generalized behavior. The first phase includes the function ExtractPrecondition of the algorithm shown in FIG. 12.

The function ExtractPreconditions includes a sequence of steps S124, S125, and S126 as shown in FIG. 4.

In step S124 subsequent to step S123 of FIG. 3, for each effect cluster determined in step S122 of FIG. 3, preconditions pre are extracted. While the known LOFT algorithm uses an inner and outer search to learn the preconditions PRE, the process S12 of learning individual skills from training data D according to the embodiment presents a different approach presented in FIG. 4. The presented approach offers a simpler and faster approach to extract the preconditions pre advantageous in particular with regard to the required computational resources.

Step S124 proceeds with calculating the preconditions pre as the intersection of all states s of the demonstration tuples (s, a, s') in one effect cluster. In particular, the predicates that are true in all observed demonstration tuples (s, a, s') (demonstrations) before executing the skill a. The approach of step S124 may produce highly specialized, even overspecialized preconditions pre, but in a subsequent generalization following step S124, the preconditions pre may potentially be further relaxed by looking at multiple skills at once and, hence, at more data. Due to learning from human demonstrations in the demonstration tuples (s, a, s') means few training data D. Learning from human demonstrations in the demonstration tuples (s, a, s') means in particular no negative examples, making the learning of precise preconditions pre even harder. Hence, using the proposed approach in step S124 improves simplicity and efficiency, and leverages additional data during the generalization in to update the preconditions pre.

Using the proposed approach in step S124 increases simplicity and improves efficiency, and may leverage additional data during the generalization to update the preconditions pre in a potential further step during interaction and feedback.

In step S125 subsequent to step S124 included in function CreateSkill of the program of the process of learning individual skills from the training data D illustrated in FIG. 12, a learned individual skill is generated including the skill a, the extracted preconditions pre, the calculated effect eff, associated with the learned skill.

In step S126 following step S125, the generated learned individual skill from step S125 is added to the skill set S. The step S126 forms part of function CreateSkill of the program of the process S12 of learning individual skills from the training data D illustrated in FIG. 12.

FIG. 5 shows a fourth flowchart that illustrates simplified steps of learning generalized skills from the training data D, in particular iteratively generalizing learned individual skills until a convergence criterion is met in a process of learning a generalized behavior.

FIG. 5 includes a sequence of processing steps displaying the second phase of step S13 in FIG. 2 in more detail that iteratively generalizes learned individual skills until the convergence criterion is met.

In the sequence of steps S131 to S134, the method iteratively tries to find skills with similar effects and uses the given hierarchy information to generalize the skills. In particular, for each pair of skills (si, sj) with similar effects possible variable type generalizations are generated and tested.

In step S131, pairs of skills $(s_i, s_j)$ with similar effects as possible variable type generalizations are generated.

Similar effects are defined as skills having a same set of predicates $s^{eff}_i = s^{eff}_j$.

For each generated pair of skills $(s_i, s_j)$, steps S132 to S134 are performed.

In step S132, executing the function CreateGenPars of the program chart of FIG. 12, the process proceeds with calculating the generalized parameters $p_g$ from the skills $(s_i, s_j)$ by using the given entity hierarchy. For each corresponding parameter pair from $s_i$ and $s_j$, the lowest common ancestor is calculated and added as proposed generalization to form new generalized parameters $p_g$.

In subsequent step S133, executing the function CreateGenSkill of the program chart of FIG. 12, the process proceeds with generating the generalized skill $s_g$ by replacing the skill parameters with the proposed new generalized parameters $p_g$.

In step S134 following step S133, the process continues with updating the learned preconditions pre by considering the intersection of the preconditions of $s_i$ and $s_j$ after performing the skill parameter replacement of step S133, and considering all elements of a powerset $(P(\bullet))$ of the difference of their preconditions, i.e., creates a set of candidate preconditions:

$$\{(s^{pre}_i \cap s^{pre}_j) \cup pre \mid pre \in P(d)\}; \tag{1}$$

with $$d = (s^{pre}_i \cup s^{pre}_j) - (s^{pre}_i \cap^{pre}_j) \tag{2}$$

The powerset $(P(S))$ of a set S is a set that includes all subsets of S, including the empty set and the set S itself. Considering a set S1={a, b, c} and set S2={a, b, d, e}, the powerset $(P(S1 \Delta S2))$ is $(P(\{c, d, e\}), \{\{ \}, \{c\}, \{d\}, \{e\}, \{c, d\}, \{d, e\}, \{c, e\}, \{c, d, e\}\}$. The operator "A" denotes the symmetric difference d.

Figure 6:
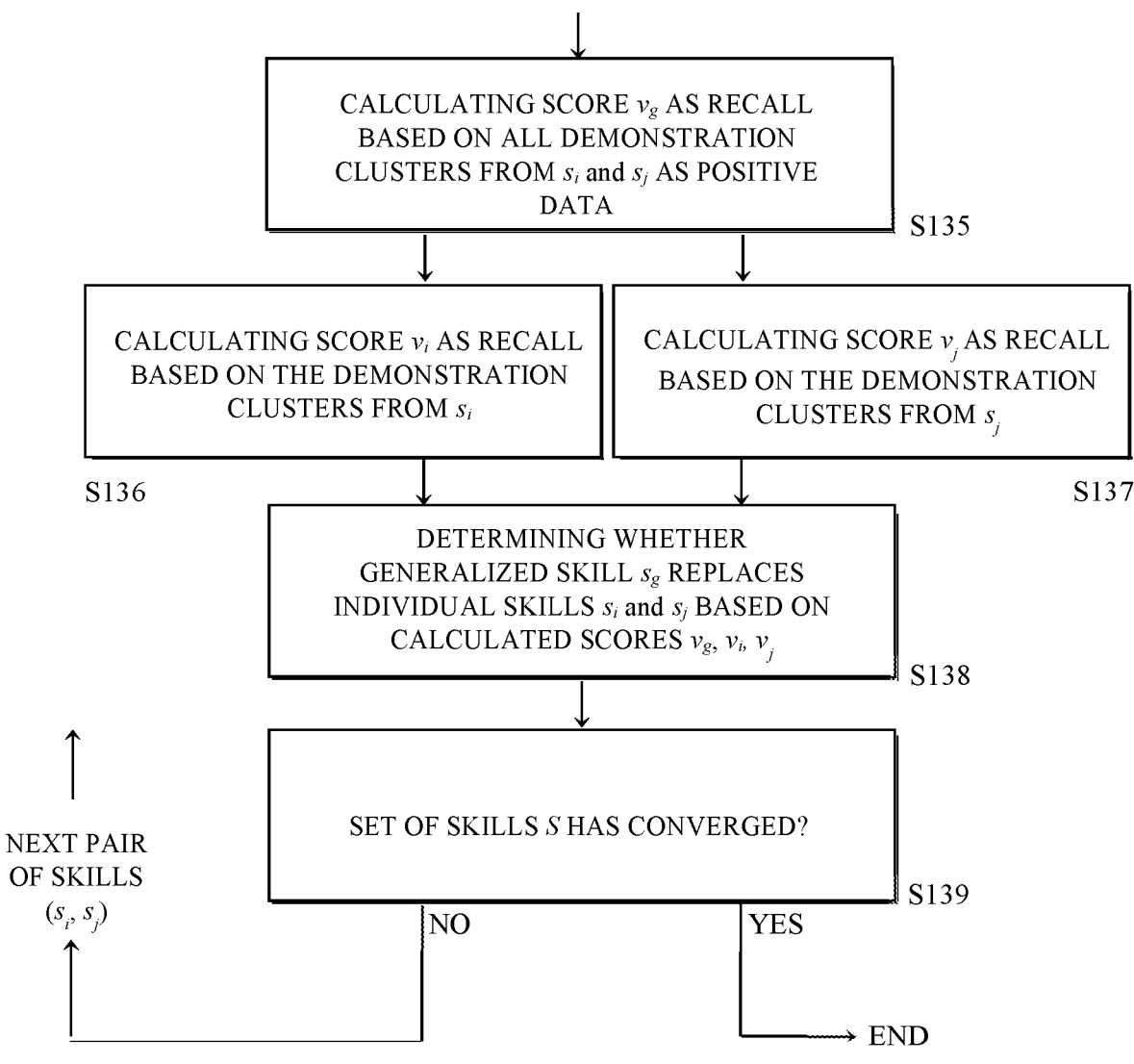
FIG. 6 shows a fifth flowchart that proceeds to FIG. 5 with simplified steps of learning individual skills from training data, in particular iteratively generalizing learned individual skills until a convergence criterion is met, in a process of learning a generalized behavior.

In subsequent step S135 depicted in the flowchart of FIG. 6, the process proceeds with calculating a score $v_g$ as a recall using all demonstration clusters from $s_i$ and $s_j$ as positive data.

Thus, in order to summarize, the demonstration clusters are clustered according to their effect and action a. For each demonstration cluster, a skill is then learned afterwards. Thus, those demonstration clusters that were used to learn $s_i$ and $s_j$ respectively, are used as the relevant demonstrations for the generalized skill.

The function recall ( ) corresponds to a standard measurement in information retrieval and measures the true positive rate or the sensitivity.

In particular, the function recall ( ) defines the fraction of covered demonstrations of the relevant demonstration clusters. The value returned by the recall-function is between 0 and 1, e.g., the score vg $$vg \in [0;1]; \tag{3}$$

A larger value for the score vg determined by the recall-function indicates a higher number of covered demonstrations by the respective demonstration cluster.

In order to emphasize simple skills, two additional correction terms may be subtracted as additional punishments subtracted from the recall-function in order to generate the final score.

A first correction term includes the number of predicates in the preconditions.

A second correction term includes the number of variables in the skill.

Both correction terms correspond to values that are downscaled by a constant factor in order to arrive at a value smaller than 1.

The candidate skill with the largest final score vg is selected. FIG. 6 shows a fifth flowchart that proceeds to FIG. 5 with simplified steps of learning generalized skills from the training data D, in particular iteratively generalizing learned individual skills until a convergence criterion is met, in the process of learning a generalized behavior.

The generalized skill $s_g$ is generated with the best performing preconditions from the candidate set with the score $v_g$.

In step S136, the process proceeds with calculating a score $v_i$ as a recall using all demonstration clusters from $s_i$.

In step S137, the process proceeds with calculating a score $v_j$ as a recall using all demonstration clusters from $s_j$.

It is noted, that steps S135, S136, and S137 may calculate the scores for the individual skills $s_i$, $s_j$ and the candidate for the generalized skill $s_g$ at least partially in parallel or sequentially. The function ScoreSkill in the program chart of FIG. 12 calculates the respective scores for the individual skills $s_i$ and $s_j$ similarly as described before on their respective demonstration clusters in order to enable determining if the generalized skill $s_g$ should be kept in the set of skills S.

In step S138, the process determines whether the generalized skill $s_g$ replaces the individual skills $s_i$ and $s_j$. The generalized skill $s_g$ replaces the individual skills $s_i$ and $s_j$, if step S138 determines based on the calculated scores for the individual skills $s_i$, $s_j$ and for the candidate for the generalized skill $s_g$ that a performance of the generalized skill $s_g$ is at least as good as an average performance of $s_i$ and $s_j$:

$$s_g \geq \frac{s_i + s_j}{2}. \tag{3}$$

11 12

This process iterates by performing the sequence of steps S132 to S138 and subsequent step S139 until determining in step S139 that the set of skills S has converged. Convergence of the set of skills S may comprise that the set of skills S does not change in one iteration run (FIG. 6: step S139: "YES"). If determining that the set of skills S does not change, process S12 of learning generalized skills terminates.

If determining in step S139 that the set of skills S changed in the last iteration run (FIG. 6: step S139: "NO"), the process S12 of learning generalized skills continues with a next iteration.

Note, in the above description $s_i$ and $s_j$ are always referred to as individual skills for comprehensibility, but due to the iterations in the process, the skills $s_i$ and $s_j$ can be generalized skills, which were generalized in a previous iteration of the process already.

The set of skills S determined in the process S13 of generating iteratively generalized skills provides a extended set of skills S from a limited number of demonstrations included in the training data D.

While learning generalized skills from demonstrations as described before enables an advantageous transfer of learned skills to novel tasks and new objects in the task environment, it is limited to generalizations of the demonstrated behavior covered by the training data D. For example, considering the entity hierarchy in experiments displayed in FIG. 10, if only a skill of chopping of different vegetables is shown, the learned generalized skill will be applicable to known and novel vegetables, but cannot be grounded with fruits. Alternatively, if the skill of "chopping" is only demonstrated with the tool "cutboard" in the training data D, a novel tool such as a "breadslicer" cannot be grounded.

In order to improve the available set of skills S further, in order to cope with missing generalizations, and even with over-generalizations or with a second skill-generalization process discussed with regard to the flowcharts of FIGS. 7 and 8 and illustrated in the program chart of FIG. 13 that may be integrated and performed online during the planning process for a specific task to be performed by the autonomous device in the task environment. The second process concerns an over-generalization, e.g., may result in a generalized skill that includes the skill of "chopping" an object "coconut" with the tool "cutboard".

An unexpected behavior during execution, may include, e.g., an object such as a tool that does not behave as demonstrated in the training data D anymore, e.g., because it is broken.

FIG. 7 shows a sixth flowchart illustrating an overview over a process of imagining generalized skills. FIG. 8 shows a seventh flowchart continuing with the overview over the process of imagining generalized skills from FIG. 7. The approach is summarized in the program chart of FIG. 14 and provides generalized skills as imagined generalized skills as the autonomous device (agent) imagines a new generalization of the set of skills S without demonstrated data that needs to be validated by executing the found plan.

The process of imagining generalized skills starts with a given lifted skill set S, a grounded skill set $S_g$, and a planning task T, which is to be addressed by the autonomous device. The planning task T includes an initial state s. The process of imagining generalized skills returns an enhanced skill set S generated based on the skill set S, the grounded skill set $S_g$, the planning task T, and the initial state s.

In step S21, it is determined whether unreachable goal predicates U exist by calculating predicates in the planning task goal description that cannot be reached with S g starting from initial state s. If step S21 determines that all goal predicates can be reached, no imagined generalized skills are necessary and the process S2 of imagining generalized skills may terminate (NO).

Step S21 corresponds to the function GetUnreachable-Goals in the program chart of FIG. 13. The function GetUnreachableGoals uses the initial state s and the grounded skill set S g to calculate unreachable goal predicates U.

If step S21 determines that unreachable goal predicates U exist (YES), the process proceeds to step S22. In step S22, for each unreachable goal predicate u g, potentially suitable skills for generalization are iteratively calculated from the skill set S. The calculated potentially suitable skills for generalization are skills, which have the unreachable goal predicate in their effect set.

Step S22 corresponds to the function GetPotentialSkills in the program chart of FIG. 13. The function GetPotential-Skills calculates iteratively for each unreachable goal predicate u g potentially suitable skills for generalization from S that have the unreachable goal predicate in their effect set.

Step S23 subsequent to step S22 calculates for each potentially suitable skill of step S22 a generalization by determining a lowest common ancestor of variables in the unreachable goal predicate and the matching effect predicate of the potentially suitable skill.

Furthermore, in step S23, all variables of the potentially suitable skill are checked and generalized to a lowest common ancestor of itself and the available objects in the planning task.

Step S24 then proceeds with generating a new skill $s_i$ with the parameter generalization $p_i$, and added to the skill set S.

Steps S23 and S24 correspond to the function CreateImaginedSkill in the program chart of FIG. 13. The function CreateImaginedSkill calculates for each potentially suitable skill the generalization by finding the lowest common ancestor of the variables in the unreachable goal predicate and the matching effect predicate of the potentially suitable skill. All variables of the potential skill are checked and generalized to the lowest common ancestor of itself and the available objects in the planning task T. With the parameter generalization pi, the new skill $s_i$ is subsequently generated and added to the skill set S.

In step S25 following step S24, the process S2 of imagining generalized skills checks if the predicates in the preconditions of the new skill $s_i$ generated in step S24 can be reached and then proceeds with adding unreachable predicates to the set of unreachable goal predicates U in step S26.

Steps S25 and S26 correspond to the function CreateImaginedSkill in the program chart of FIG. 13.

The process S2 of imagining generalized skills proceeds with step S27 that includes propagating the proposed parameter generalizations $p_i$ to all skills that have the same set of parameters. In step S28, the generalized skills are then added to the enhanced skill set S.

Steps S27 and S28 correspond to the function CreateImaginedSkill in the program chart of FIG. 13, which accordingly performs propagates the proposed parameter generalizations $p_i$ to all skills that have the same set of parameters and adding the generalized skills to the enhanced skill set S.

After performing the process S2 of imagining generalized skills, the enhanced skill set S contains new generalized skills, which represent additional proposals that may be used to solve the posed planning problem that was not solvable with the originally available skill set S.

The process S2 of imagining generalized skills may be used in a planning process using generalized skills.

The learned generalized skills may be translated into PDDL representations.

In order to solve planning tasks with the learned generalized skills planning as heuristic search approach may be used. A heuristic search approach (Bonet et al, 2001) with an A* search algorithm according to (Hart, Nilsson, and Raphael 1968) and an adapted ordered landmarks heuristic (Hoffmann et al, 2004; Richter 2010) may be employed. A landmark is a grounded predicate that needs to be fulfilled or reached during planning to solve the task. The ordered landmarks may be clustered based on the objects in the planning goal description, resulting in multiple landmark sequences, allowing the heuristic planner to explore with less restrictions. The heuristic is based on the idea to count the unreached landmarks (Richter, 2010), where a landmark is only marked as reached if all predecessor landmarks have been reached before. Penalties are added to the heuristic for skills that do not operate on goal objects and that do not reach new landmarks. Goal objects are objects that are defined in the planning goal.

The planning process using the generalized skills addresses a given planning task T comprising the initial state s of the environment and the goal description. The planning process further requires the skill set S as input. The planning process generates the grounded skill set S g from the given skill set S, the entity hierarchy, and the initial state s of the environment.

Subsequently, the planning process runs the process S2 of imagining generalized skills in order to determine potential imagined skill generalizations: if step S21 reveals that |U|=0, it is determined that the task can be solved with the current set of grounded skills $S_g$, the process of imagining generalized skills is terminated. In consequence, no imagined skills are added the set of skills S.

In case of the planning process finding and outputting a plan to address the given task, the autonomous device starts to execute the plan in the task environment using a fixed deterministic policy. After each executed skill, the autonomous device checks if the expected effect that is the effect set of the executed skill, matches the observed effect of the executed skill in the task environment. The observed effect corresponds to a change in the observed task environment. If the autonomous device observes a mismatch, the execution of the plan is aborted and a new planning process for searching for a new plan proposal is started. For the rerun of the planning process to find a new plan proposal, objects involved in the aborting skill are excluded during the continued search. The planning process runs the process S2 of imagining generalized skills again to check if new imagined skills should be added. The strategy to exclude objects involved in the aborting skill assumes that the excluded object is itself the source of the unexpected effect. An example may be that, e.g., a tool is broken and not working according to the expectations and knowledge. Thus, the planning process running the process S2 of imagining generalized skills again guides to searching for alternative objects.

Figure 9:
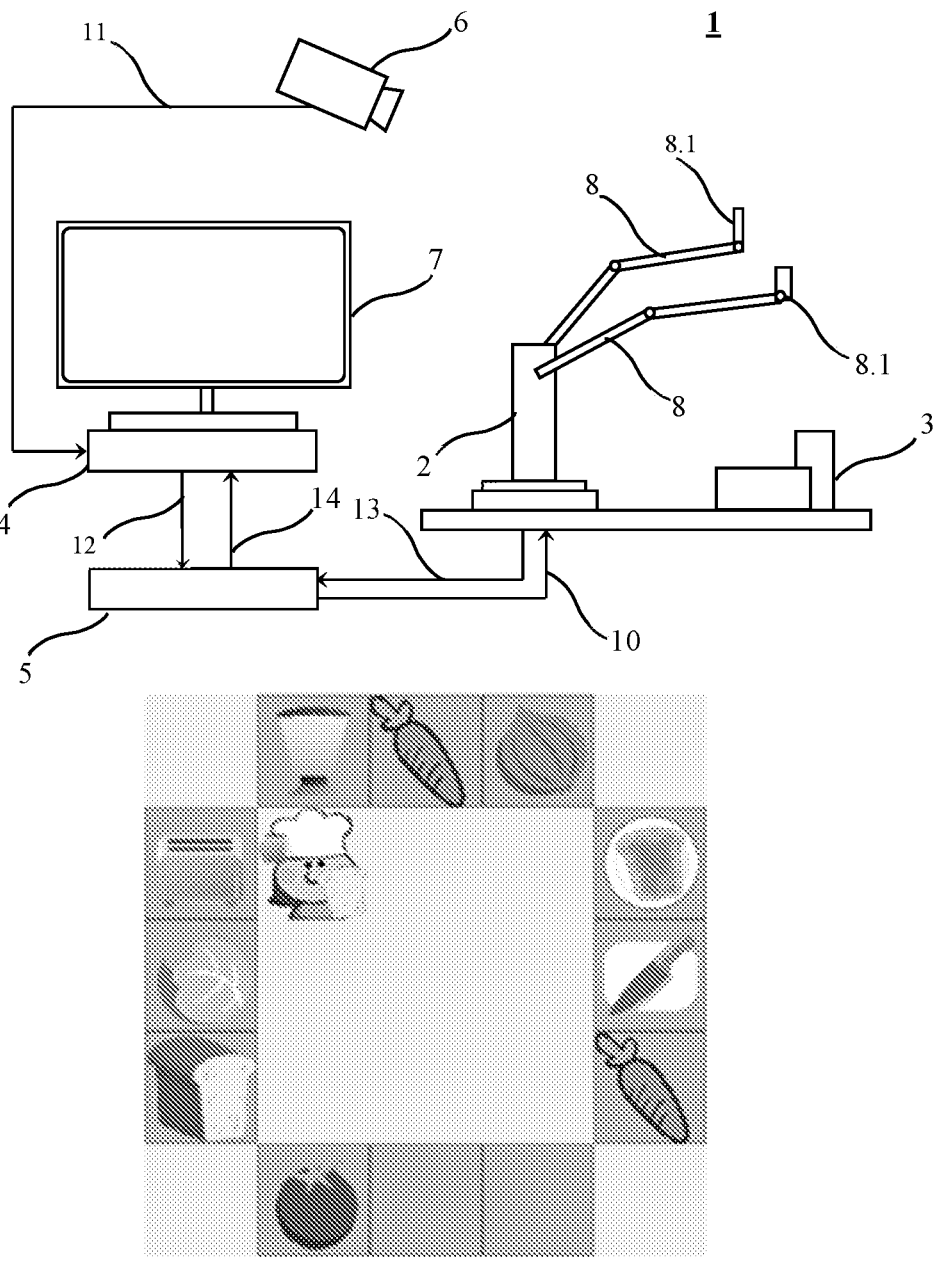

FIG. 9 illustrates a specific application scenario of the method for planning a behavior of an autonomous device 2 in a kitchen environment including an agent and a plurality of entities the autonomous device 2 may interact with.

The autonomous device 2, or agent, is an artifact whose configuration of sensors, actuators, and integrated control system provides a significant level of flexible, independent, and autonomous skill. The term autonomous denotes the extent to which autonomous device 2 is able to sense the environment, capable to plan a behavior based on the sensed environment, and to act by performing sequences of actions or skills based on the sensed environment with the intent of reaching a goal without external control. The goal may be provided to the autonomous device 2.

Alternatively, the goal may be created by the autonomous device 2 itself.

A robotic system 1 of the upper portion of FIG. 9 comprises the autonomous device 2, shown as a stationary bi-manual robot, with two effectors 8, an object tracking device 6, e.g. a camera- or marker-based object tracking device, and data processing equipment, e.g. at least one computer 4, which is configured to run planning algorithms and motion generation algorithms. In particular, a program implementing a planning process running the processes S1 and S2 in a process for generating a plan to address a task by controlling at least one effector trajectory may run on the computer 4.

The computer 4 may include at least one processor, at least one memory, for example comprising non-volatile and volatile memories for storing program instructions, and program data generated during execution of the method.

The robotic system 1 acquires a task description for the predefined task, for example via a user interface for receiving instructions to the robotic system 1. For example, the acquired task description (task) may instruct the robotic system 1 to cut an object 3 into a predefined number of slices in a household application including a kitchen scenario.

The object tracking device 6 determines a current location of the object 3 in the task environment. The object tracking device 6 generates a sensor signal 11 and provides the sensor signal 11 to the computer 4. The sensor signal 11 may enable the autonomous device 2 to monitor a task progress while performing a sequence of skills.

The computer 4 may run a motion planning algorithm that decomposes the acquired task into a sequence of actions or skills. This may be done using an A*-search algorithm for example.

The robotic system 1 computes a posture of the autonomous device 2 for each skill or action of the sequence of skills and adds all computed postures into an overall kinematic model. The robotic system 1 analyses the sequence of postures for contact changes and object motions in each individual step with regard to an immediately preceding step of the sequence of postures.

The computer 4 generates a model representing a task description for addressing the predefined task.

The generated trajectories for end effectors 8.1 may be passed to an inverse kinematics algorithm that computes the corresponding robot postures, which are sent in a control signal 12 to a robot control unit 5. The robot control unit 5 of the robotic system 1 then controls actuators of the effectors 8 of the autonomous device 2 using actuator control signals 10 generated based on the control signal 12.

The autonomous device 2 may generate a status signal 13 and output the status signal 13 to the robot control unit 5. The robot control unit 5 may provide the information contained in the status signal 13 along with further status information on the autonomous device 2 to the computer 4 in a status signal 14.

The computer 4 may comprise input/output means, for example, output means such as a monitor 7 for displaying image information to a user, and input means such as keyboard and a mouse device for receiving operation input from the user. The computer 4 may in particular run software implementing a user interface, for example a GUI for interacting with the user. In a specific embodiment, the first acquisition unit and the second acquisition unit may be implemented in software running on the computer 4 of the robotic system 1 including interfaces for receiving data and transmitting data. The computer 4 may also include software running on the at least one processor for learning the set of individual skills, and generating the set of generalized skills. Alternatively, the first acquisition unit and the second acquisition unit may be implemented in software running on a computer not forming part of the robotic system 1 that includes interfaces for receiving data and transmitting data. The computer (remote computer, server) may also include software running on the at least one processor for learning the set of individual skills, and generating the set of generalized skills and communicate with the computer 4 via a network.

The structure of the robotic system 1 as shown in the upper portion of FIG. 9 is one example. It is noted, that some or all structural elements, e.g. the computer 4, the robot control unit 5, and the object tracking device 6 may be integrated into the autonomous device 2.

The autonomous device is not limited to a stationary device, but may also be implemented as a mobile autonomous device 2 moving in the task environment. The task environment may include a kitchen as illustrated in the lower portion of FIG. 9.

The framework including the processes S1 and S2, respective the algorithms of FIGS. 12 and 13, can be implemented on the autonomous device 2 implementing an assistive household robot. For helping in a kitchen, the autonomous device 2 needs to know about foods and kitchen tools, how they can be used, which effects the kitchen tools produce, for example. For this purpose, given a hierarchy of all the entities present in the kitchen as the current task environment, can be taught beforehand and/or extracted from other knowledge sources like, e.g. a publicly available data bank accessed via a computer network. The autonomous device 2 is shown some tasks, e.g., preparing a sandwich, that includes skills comprising cutting bread, toasting bread, cutting lettuce, skinning and slicing a tomato, for example. The proposed creating of type-generalized skills, the autonomous device 2 acquires the capability to learn an abstract symbolic representation of the involved actions, e.g. cutting, toasting, picking, etc., that can be used in novel situations in the task environment. For example, when tasked to prepare a bagel, the autonomous device 2 can transfer the skills learned from bread to bagels using the entity hierarchy. Additionally, with the imagined actions, the autonomous device 2 can also adapt to currently available entities, e.g., there is no toaster in the kitchen, but instead there is a contact grill and the autonomous device 2 can propose to use the contact grill instead of the toaster.

To evaluate the effect of the processes S1 and S2 for generating type-generalized skills, experiments in a simulated kitchen environment according to the lower portion of FIG. 9 as a task environment for the autonomous device 2 were conducted.

In the gridworld task environment illustrated in FIG. 9, the autonomous device 2 can interact with various different objects that include food and kitchen tools to manipulate the food. FIG. 11 provides an overview of the available objects in the task environment and their hierarchy. The agent may move in four directions in the task environment and interact with the object arranged in front of the agent. The available interactions comprise three skills. A first skill PICK corresponds to picking up an object. A second skill PLACE corresponds to placing down an object that the agent currently holds. A third skill USE corresponds to the agent interacting with a tool.

The system performs learning of the individual skills from human demonstrations of some basic tasks executed in the simulated kitchen environment included in the training data D. A low-level state x coming from the simulator is a list of the entities in the environment with observable attributes and relations. To compute the symbolic state s, a set of logical predicates is used to describe relations among one or more entities, which are automatically generated from the observed attributes and used to parse the low-level state x into the symbolic state s, $$s=\text{PARSE}(x), \tag{4}$$

such that the symbolic state s consists of all predicates that hold in the low-level state x.

Predicates may be grounded or lifted. Grounded means that the predicate has concrete entities as parameters. Lifted means that the predicate has variables as parameters.

A skill is also referred to as grounded of lifted correspondingly to the predicates.

A skill a is also represented as a special skill predicate with an interacted entity as a parameter of the skill.

All tasks performed during training and during evaluation in the kitchen scenario consist of preparing food by manipulating the food with certain tools and the prepared food is to be placed onto a plate. Tasks are specified exclusively with a desired state (target state) of the food. In the experiment, only one demonstration per individual task is included in the observations included in the training data D. Thus, learning is performed based on few training data D and without including negative demonstrations. The training data D for the experiment includes observations on seven tasks that are demonstrated:

1) cutting a lettuce
2) cutting a banana
3) blending a carrot
4) toasting a bread
5) toasting two bread
6) cutting a tomato and an onion
7) cutting a lettuce and blending a carrot The seven task demonstrations 1) to 7) provide 58 state transitions for learning (s, a, s') tuples termed the training data D.

Figure 10:
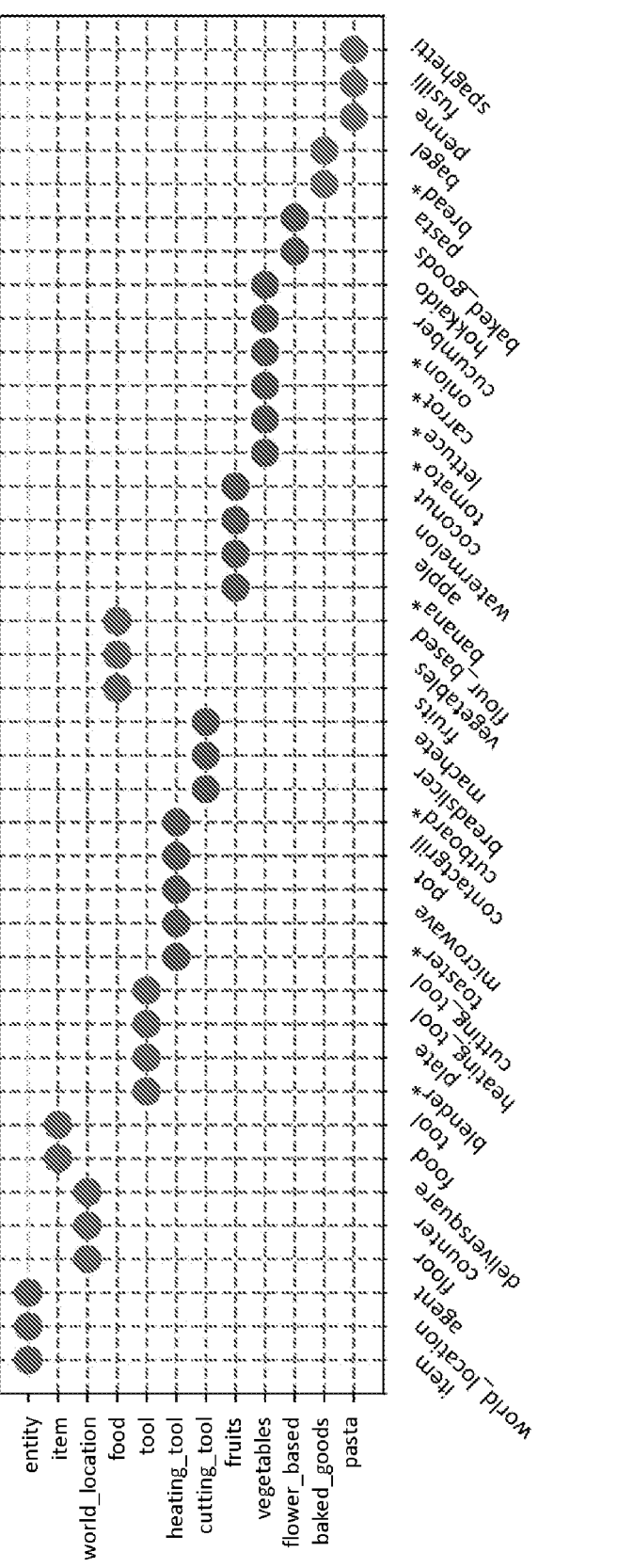
FIG. 10 visualizes a hierarchy of entities involved in the application scenario of FIG. 9.

In addition to the demonstrated training tasks, the robotic system 1 obtains a hierarchy of possible entities shown in FIG. 10. The hierarchy of possible entities is used to learn generalized skills and to imagine generalized skills, and for grounding the lifted skills during the planning process, e.g., to know which particular objects in the task environment can be grounded for specific lifted parameter types.

FIG. 10 visualizes a hierarchy of entities involved in the application scenario of FIG. 9.

The visualization of the given entity hierarchy displays parents on the y-axis and children on the x-axis. A dot in FIG. 10 indicates a connection between a parent and a child. A shading of the dot in FIG. 10 indicates a corresponding depth level inside the hierarchy. The depth level ranges from top to bottom, and the asterisk "*" associated with an entity indicates that the entity was shown in the demonstrations included in the training data D.

To evaluate the generalized skills provided by the implementations of the first and second processes, the generalized skills were tested executing a variety of tasks requiring different kinds of generalization. In FIG. 11, the tasks are divided into six sets of tasks ranging from S1 to S6. The results are summarized in the table shown in FIG. 11 and discussed with reference to FIG. 11.

FIG. 11 displays the table illustrating an evaluation of learned skills in different sets of planning tasks in an exemplary application of a planning process for the autonomous device.

The evaluation concerns learned skills on different sets S # of planning tasks T #.x. The table enables to compare a use of generalized skill, illustrated are 13 skills, and individual skills, shown are 38 individual skills in the table, and their hierarchical combination. The table bases on results obtained over 5 runs each with 60 s timeout for planning. The term "N/A" indicates that no plan was found during the planning runs. In the table, the term "succ." standing for success indicates how often a found plan was successfully executed by the autonomous device. The term "#p" indicates how many plans where proposed until success. The parameter "time" measures the total planning time in s, where each instance of the parameter time is shown by mean value and standard deviation. The parameter |p| corresponds to an indicator for a task complexity by measuring a length of the successful plan as the length of the skill sequence to solve the task. All tasks end with the stated prepared food put onto a plate, the environment size of the task environment was 6×6 with 32 objects in the task environment. Tasks marked with * triggered the execution of the imagined generalized skills algorithm during the planning process.

The different sets of tasks S1 to S6 are defined depending if involved entities and tasks have been demonstrated (yes) or not (no).

S1: food (yes) tools (yes) tasks (yes) (training data)
S2: food (yes) tools (yes) tasks (no)
S3: food (no) tools (yes) tasks (no)
S4: food (no) tools (no) tasks (no)
S5: food (no) tools (no) tasks 4 (no) (additionally, the known tools are broken)
S6: food (no) tools (no) tasks (no) (over generalization errors)

All tasks are defined by the predicates that must be fulfilled, e.g., chop state Chopped(cucumber 1:cucumber) for the task of chopping a cucumber, where a task can involve multiple entities, and all involved entities must be placed onto a plate. Tasks are considered successfully solved if all target predicates (goal predicates) are fulfilled in a state when the agent executed the plan.

FIG. 11 shows the 1 the evaluation results for the sets of tasks S1 to S6 in form of a table. Three variants are distinguished:

1) "generalized+individual" uses a hierarchical combination of the generalized and individual skills during planning. This may include storing for the generalized skills from which individual skills a respective generalized skill was generated, and the stored information is used during the planning process.
2) "generalized" uses only the generalized skills in the planning process.
3) "individual" uses only the learned individual skills and represents a baseline, e.g., for a comparison for variants (1) and (2). Variant (3) bases on known approaches, e.g., discussed by (Silver et al. 2021).

The evaluation shown in FIG. 11 illustrates that for solving already demonstrated tasks with the same objects in task set S1, using the learned skills on the same tasks as they were learned from, the individual skills outperform the generalized versions in terms of planning time. This can be explained by the fact that the individual skills are more specific and hence there are less grounded skills for the planning process to consider, although there are significantly more learned lifted skills with 38 skills compared to the 13 skills.

With known objects but novel tasks in task set S2, e.g., novel combinations of targets (goals), the individual skills start to fail to solve most of the tasks already, whereas the generalized skills manage to solve all tasks. The generalized skills demonstrate their capability to transfer to novel target combinations and to manage more complex tasks and, in particular, longer tasks. This is, e.g. apparent for |p|, where the maximum value demonstrated was |p|=15).

Similar results to the task set S2 can be observed in FIG. 11 for the remaining task sets S3 to S6, showing that the generalized skills may solve all tasks, are capable to transfer to novel target combinations and new objects, e.g. food and kitchen tools.

Concerning the task set S5, for example, the demonstrated kitchen tools are broken and not available. Due to the imagined generalized skills algorithm integrated in the planning process, the tasks can be solved. The evaluation of the simulations of the task set S5 show that it requires multiple plan proposals as the malfunction of the kitchen tools is unknown to the autonomous device and only gets known when trying to execute the proposed plans using the kitchen tools.

Similar, in the evaluations based on the task set S6, the learned generalized skills exhibit over-generalization errors, e.g., generalizing the tool "cutboard" to all particular types of food as this is the lowest common ancestor of the demonstrated entities in the training data D. However, this generalization must not be necessarily true for all children entities. E.g., cutting an instance "coconut" of food may be infeasible using the tool "cutboard". The generalization allows the planning process to propose such a false plan in the first place. The autonomous device can try the proposed plan in order to gather more information. Stating a failure when trying to execute the proposed skill and after failure, the imagination algorithm implementing the process of imagining generalized tasks can proceed with proposing to use another kitchen tool, in particular a "cutting tool", such as the "machete", to solve the task.

Comparing the hierarchical combination of generalized and individual skills in the column "generalized+individual" of FIG. 11 with using only the generalized skills in the column "generalized" shows that for performing less complex tasks, the distilled knowledge in the generalized skills is more efficient in terms of a shorter planning time. As the task complexity increases, the additional information in the hierarchical combination can accelerate the planning process. Additionally, in certain tasks, e.g., see task set T1.3 in FIG. 11, the hierarchical combination succeeds in finding a slightly shorter plan due to the additional more specific knowledge included in the individual skills.

While the learned and imagined generalized skills may produce similar skills and solve similar tasks, the learned skills are backed by training data D. Training data D includes in particular successful demonstrations.

The imagined skills represent proposals for skills that may be used to solve the otherwise unsolvable task. The imagination process allows the system to propose such explorative skills and plans that can be tested by the autonomous device. Looking at the planning time shown in FIG. 11, e.g. the task sets T3.3 and T3.4, "cut a watermelon & blend a carrot" and "cut an apple & blend a banana" respectively, are similar and of a same complexity. Here the imagination process proves more expensive. Task set T3.3 can be solved with the learned generalized skills, while task set 3.4 triggers the imagined generalized skills process because the tool "blender" was only demonstrated on the food "carrot" and hence no generalized skill is learned in the generalized skill process. The imagination process proposes to generalize the usage of the tool "blender" to also include the food "banana" to successfully solve the task. Thus, storing the generalized knowledge in learned generalized skills is more efficient compared to an on-the-fly generalization using the imagination process. The imagination process provides explorative skills and plans to potentially solve more tasks and gather additional information to enhance the available training data D to update the learned skills.

Embodiments of the method is useful for robotic systems employed in a variety of application scenarios. The robotic system may include an autonomous device acting as a robot companion at home, which is adapted to provide support, e.g., in the kitchen as the task environment. In order to help with preparing meals as task, the autonomous device has skills available that use different kitchen tools and objects, and requires knowledge what effect the kitchen tools and objects have on food, in particular, which effect on which food may be achieved with which of the kitchen tools. Having to demonstrate all possible objects and combinations of objects to the autonomous device would be tedious, annoying, and time-consuming. The result would adversely affect an acceptance of such robot companions for kitchen scenarios. The embodiments of the method for planning robotic behavior based on type-generalized skills, however, enables the autonomous device to learn instead to generalize from training data D that includes few observations to other objects in the kitchen, e.g. kitchen tools and kinds of food that behave similar. The autonomous device learns faster and provides more support as the autonomous device transfers its learned individual skills via the type-generalized skills to novel situations and new objects, increasing the abilities of the autonomous device and enhancing flexibility of the autonomous device during operation. Additionally embodiments of the method create a proactive autonomous device that can propose new skills for interactive learning. Learning skills for the autonomous device may require less time for a skilled and highly paid robotic expert by focusing on a reduced set of training data D, on which the method for planning robotic behavior based on type-generalized skills may then expand its space of available skills.

In an alternate application scenario, embodiments of the method for planning robotic behavior based on type-generalized skills may find advantageous application in a workshop or factory environment with similar effects than those discussed with respect to the kitchen scenario.

Additionally, the presented concept of type-generalization can may be linked with explainable artificial intelligence (abbreviated: XAI) mechanisms. XAI, as well as interpretable artificial intelligence (abbreviated AI) or explainable machine learning (abbreviated XML) refers to AI in which humans are enabled to understand decisions, predictions or actions made by AI. XAI may enable users to of AI based systems to perform more effectively and improve acceptance and trust of users of such systems. The autonomous device or the method may include means for explaining its transferred behavior to a user, e.g., why the autonomous device applies a particular skill to a novel object. Thereby, the system may explain, e.g., what has been done, what is done right now, what will be done next and may even unveil the information the skills are based on. As a result, the system may enable the user (i) to confirm existing knowledge (ii) to challenge existing knowledge and (iii) to learn new assumptions.

Additionally, creative planning mechanisms including the concept of type-generalization can use type-generalization to solve new tasks or to adapt to changing task environments by being capable to transfer the type-generalized skills.

FIG. 12 shows a program structure in pseudo-code of an embodiment of the process of learning generalized skills. The program structure represents one possible implementation of the process S1 for learning generalized skills, which is discussed in detail with reference to the flowcharts in FIGS. 2 to 6.

FIG. 13 shows a program structure in pseudo-code of an embodiment of the process of imagining generalized skills. The program structure represents one possible implementation of the process S2 for imagining generalized skills, which is discussed in detail with reference to the flowcharts in FIGS. 7 and 8.

FIG. 14 illustrates the processes of learning generalized skills and imagining generalized skills in an application scenario in an overview.

Simplified sketch of a skill-learning algorithm, according to FIG. 12, and a skill-creating algorithm, e.g. according to FIG. 13, applied to the tasks of learning to chop different foods. First, the skill-learning algorithm learns a set of individual skills from demonstrations, i.e., individual skills for cutting lettuce, cutting banana, cutting tomato, and cutting onion with a cutboard as the used tool. Subsequently, the learned individual skills are generalized based on their effects and the predetermined entity hierarchy to generate a generalized cutting skill for food.

During a planning phase, the skill-creating algorithm generates imagined generalized skills, i.e., proposed generalizations based on effects, on the entity hierarchy, and on the available entities in the current planning problem. The preconditions PRE and effects EFF displayed in FIG. 14 visualize only a simplified subset for improving clarity and comprehensibility. FIG. 14 shows the learned lifted skills, in which "?x0" denotes a variable name followed by a type of the variable.

All features described above or features shown in the figures can be combined with each other in any advantageous manner within the scope of the disclosure. In the detailed discussion of embodiments, numerous specific details were presented for providing a thorough understanding of the invention defined in the claims. It is evident that putting the claimed invention into practice is possible without including all the specific details.

What is claimed is:

1. A computer-implemented method for learning operators for planning a behavior of an autonomous device, the method comprising:

obtaining a set of training data including observations on a plurality of skills executable by the autonomous device in an interaction with at least one entity for addressing a first task;

obtaining a set of predetermined data defining a hierarchy of entities including the at least one entity;

learning a set of individual skills based on the obtained set of training data;

generating an enhanced set of skills by generalizing the individual skills of the learned set of individual skills based on the predetermined set of data that defines the hierarchy of entities and adding the generalized individual skills to the set of individual skills, and repetitively performing the step of generating the enhanced set of skills by generalizing the individual skills of the learned set of individual skills based on the predetermined set of data until a convergence criterion is met;

determining that the convergence criterion is met when, in the step of generalizing the individual skills of the learned set of individual skills, no new generalized skill can be found; and performing behavior planning of the autonomous device for addressing a second task different from the first task based on the enhanced set of skills.

2. The method according to claim 1, wherein
the step of learning a set of individual skills based on the obtained set of training data includes:

calculating, for each demonstration tuple of the training data, a grounded effect by calculating a difference between an initial state and a resulting state, wherein the each demonstration tuple includes an initial state before the action was executed, the action, and the resulting state after the action is executed;

clustering the demonstration tuples based on the skill and the calculated grounded effects into effect clusters; and lifting the demonstration tuples included in each of the effect clusters by replacing the at least one entity with at least one variable that includes the at least one entity.

3. The method according to claim 2, wherein
the step of learning a set of individual skills based on the obtained set of training data further includes extracting preconditions for each of the determined effect clusters.

4. The method according to claim 2, wherein
the step of learning a set of individual skills based on the obtained set of training data further includes calculating preconditions as the intersection of all initial states of the demonstration tuples in each of the determined effect clusters, generating a learned individual skill including the skill, the calculated preconditions, the calculated effect, associated with the learned individual skill, and adding the learned individual skill to the set of individual skills.

5. The method according to claim 4, wherein
repetitively performing the step of generating the enhanced set of skills by generalizing the individual skills of the learned set of individual skills based on the predetermined set of data includes generating pairs of skills with similar effects from the set of individual skills to generate possible variable type generalizations, calculating generalized parameters from the skills based on the predetermined set of data defining the hierarchy of entities for each of the generated pairs of skills, generating the generalized skill $s_g$ by replacing skill parameters of the generated pairs of skills with the calculated generalized parameters, updating the calculated preconditions based on an intersection of the preconditions of $s_i$ and $s_j$, and based on all elements of a powerset (P(•)) of the difference of their preconditions to generate a set of candidate preconditions based on $$\{(s_i^{pre} \cap s_j^{pre}) \cup \text{pre} \mid \text{pre} \in P(d)\};$$

with $$d = (s_i^{pre} \cup s_j^{pre}) - (s_i^{pre} \cap s_j^{pre})$$

22 calculating a score $v_g$ as a recall based on demonstration clusters from $s_i$ and $s_j$, calculating a score $v_i$ as a recall based on the demonstration clusters from $s_i$, calculating a score $v_j$ as a recall based on the demonstration clusters from $s_j$, determining whether replacing the individual skills $s_i$ and $s_j$, by the generalized skill $s_g$ based on the calculated scores $v_g$ and $v_i$ and $v_j$.

6. The method according to claim 5, wherein
determining to replace the individual skills $s_i$ and $s_j$, by the generalized skill $s_g$ in case of determining that a performance of the generalized skill $s_g$ is equal to or exceeds an average performance of the individual skills $s_i$ and $s_j$.

7. The method according to claim 5, wherein
determining to replace the individual skills $s_i$ and $s_j$, by the generalized skill $s_g$ in case of determining that $$v_g \geq \frac{v_i + v_j}{2}.$$

8. The method according to claim 1, wherein
the step of performing behavior planning of the autonomous device for addressing the second task different from the first task based on the enhanced set of skills further includes determining whether unreachable goal predicates exist by calculating predicates in an obtained planning task goal description that cannot be reached with the enhanced set of skills starting from an initial state.

9. The method according to claim 8, wherein
in case of determining that unreachable goal predicates exist that cannot be reached with the enhanced set of skills starting from an initial state, the step of performing behavior planning of the autonomous device for addressing the second task further includes calculating repeatedly for each unreachable goal predicate potentially suitable skills for generalization from the enhanced set of skills, wherein the potentially suitable skills have the unreachable goal predicate in their effect set, generalizing each potentially suitable skill by determining a lowest common ancestor of variables in the unreachable goal predicate and a matching effect predicate of the potentially suitable skill, generalizing all variables of the potentially suitable skill to a lowest common ancestor of itself and the available entities in the planning task to generate a parameter generalization, generating a new skill with the parameter generalization, and add it to the enhanced set of skills, determining whether predicates in preconditions of the generated new skill can be reached, and adding determined unreachable predicates to the set of unreachable goal predicates, propagating the proposed parameter generalizations to all skills that have a same set of parameters to generate further generalized skills and adding the further generalized skills to further enhance the enhanced set of skills, and resuming performing behavior planning of the autonomous device for addressing the second task based on the further enhanced set of skills.

10. The method according to claim 1, the method comprising generating a control signal for controlling at least one actuator of the autonomous device to perform the second task based on the determined behavior, and outputting the generated control signal to the at least one actuator.

11. A non-transitory computer-readable storage medium storing a program comprising instructions executable by a computer or a digital signal processor, which, when the program is executed by the computer or the digital signal processor, cause the computer or the digital signal processor to carry out the method of claim 1.

12. A system for learning operators for planning a behavior of an autonomous device for solving a predefined task, the system comprising:

a first acquisition unit configured to obtain a set of training data including observations of a plurality of skills executable by the autonomous device in an interaction with at least one entity for addressing a first task;

a second acquisition unit configured to obtain a predetermined set of data defining a hierarchy of entities including the at least one entity;

a processor configured to;

learn a set of individual skills based on the obtained set of training data;

generate a set of generalized skills by generalizing the learned set of individual skills based on the predetermined set of data that defines the hierarchy of entities, and repetitively perform generating the enhanced set of skills by generalizing the individual skills of the learned set of individual skills based on the predetermined set of data until a convergence criterion is met;

determine that the convergence criterion is met when, no new generalized skill can be found; and perform behavior planning of the autonomous device for addressing a second task different from the first task based on the generalized set of skills.

13. A robotic system comprising the system according to claim 12 and at least one autonomous device.

* * * * *